US010871452B2

(12) United States Patent
Lincoln et al.

(10) Patent No.: US 10,871,452 B2
(45) Date of Patent: Dec. 22, 2020

(54) SYSTEMS AND METHODS FOR CHAMBERLESS SMOKE DETECTION AND INDOOR AIR QUALITY MONITORING

(71) Applicant: Kidde Technologies, Inc., Wilson, NC (US)

(72) Inventors: David L. Lincoln, Johnston, RI (US); Jennifer M. Alexander, Glastonbury, CT (US); Michael J. Birnkrant, Wethersfield, CT (US); Peter R. Harris, West Hartford, CT (US)

(73) Assignee: Kidde Technologies, Inc., Wilson, NC (US)

( * ) Notice: Subject to any disclaimer, the term of this patent is extended or adjusted under 35 U.S.C. 154(b) by 196 days.

(21) Appl. No.: 15/967,502

(22) Filed: Apr. 30, 2018

(65) Prior Publication Data
US 2018/0252654 A1 Sep. 6, 2018

Related U.S. Application Data

(63) Continuation-in-part of application No. 15/871,931, filed on Jan. 15, 2018, and a continuation-in-part of
(Continued)

(51) Int. Cl.
*G01N 21/94* (2006.01)
*G01N 21/21* (2006.01)
(Continued)

(52) U.S. Cl.
CPC ......... *G01N 21/94* (2013.01); *G01N 15/0205* (2013.01); *G01N 21/53* (2013.01);
(Continued)

(58) Field of Classification Search
CPC .... G01N 21/53; G01N 21/94; G01N 15/0205; G01N 2015/0046; G01N 2015/0693;
(Continued)

(56) References Cited

U.S. PATENT DOCUMENTS

| 4,111,559 A | 9/1978 | Smith et al. |
| 6,208,252 B1 | 3/2001 | Danilychev |

(Continued)

FOREIGN PATENT DOCUMENTS

| CN | 106781205 A | 5/2017 |
| DE | 102007057520 A1 | 6/2009 |

(Continued)

OTHER PUBLICATIONS

European Communication pursuant to Art. 94(3) EPC dated Jul. 9, 2019, issued during the prosecution of European Patent Application No. EP 18176082.8.

(Continued)

*Primary Examiner* — Hina F Ayub
*Assistant Examiner* — Amanda Merlino
(74) *Attorney, Agent, or Firm* — Locke Lord LLP; Scott D. Wofsy; Georgi Korobanov

(57) ABSTRACT

A system for detection and monitoring includes one or more light sources configured to emit light into a monitored space. At least one of the light sources is configured to emit a respective emission cone having a respective emission cone axis. One or more light sensing devices are configured to receive scattered light. At least one of the one or more light sensing devices defines a respective acceptance cone having a respective acceptance cone axis. The emission cone axis of the emission cone, and/or the acceptance cone axis of the light sensing device is angled toward the other. A processor is operatively connected to the at least one light sensing devices to evaluate the scattered light for the presence of particulates in the monitored space.

17 Claims, 14 Drawing Sheets

Related U.S. Application Data application No. PCT/US2017/037659, filed on Jun. 15, 2017.

(60) Provisional application No. 62/517,614, filed on Jun. 9, 2017, provisional application No. 62/515,039, filed on Jun. 5, 2017, provisional application No. 62/350,418, filed on Jun. 15, 2016.

(51) Int. Cl.

| | |
|---|---|
| *G08B 17/107* | (2006.01) |
| *G01N 21/53* | (2006.01) |
| *G01N 21/85* | (2006.01) |
| *G01N 15/02* | (2006.01) |
| *G01N 21/47* | (2006.01) |
| *G01N 21/64* | (2006.01) |
| *G08B 29/18* | (2006.01) |
| *G01N 15/06* | (2006.01) |
| *G01N 21/31* | (2006.01) |
| *G01N 15/00* | (2006.01) |

(52) U.S. Cl.
CPC ....... *G01N 21/8507* (2013.01); *G08B 17/107* (2013.01); *G01N 21/21* (2013.01); *G01N 21/645* (2013.01); *G01N 21/6486* (2013.01); *G01N 2015/0046* (2013.01); *G01N 2015/0693* (2013.01); *G01N 2021/3155* (2013.01); *G01N 2021/4769* (2013.01); *G01N 2021/4792* (2013.01); *G01N 2021/8578* (2013.01); *G08B 29/185* (2013.01)

(58) Field of Classification Search
CPC ... G01N 2021/3155; G01N 2021/4769; G01N 2021/4792; G01N 2021/8578; G01N 21/21; G01N 21/645; G01N 21/6486; G01N 21/8507; G08B 17/107; G08B 29/185; G08B 17/113; G08B 21/182
See application file for complete search history.

(56) References Cited

U.S. PATENT DOCUMENTS

| | | |
|---|---|---|
| 7,978,087 B2 * | 7/2011 | Siber ................. G08B 17/107 250/574 |
| 9,036,150 B2 | 5/2015 | Wedler et al. |
| 9,652,958 B2 | 5/2017 | Zribi et al. |
| 9,659,485 B2 | 5/2017 | Piccolo, III |
| 2002/0153499 A1 | 10/2002 | Oppelt et al. |
| 2009/0218526 A1 | 9/2009 | Shaw et al. |
| 2011/0216317 A1 | 9/2011 | Marra |
| 2012/0161796 A1 | 6/2012 | Smith et al. |
| 2013/0174646 A1 | 7/2013 | Martin |
| 2016/0097748 A1 | 4/2016 | Hansen et al. |
| 2016/0343226 A1 | 11/2016 | Fischer et al. |
| 2017/0153177 A1 * | 6/2017 | Siemens ............. G08B 17/113 |
| 2017/0206764 A1 | 7/2017 | Zribi et al. |
| 2017/0248699 A1 | 8/2017 | Fang et al. |
| 2017/0310809 A1 | 10/2017 | Shi et al. |
| 2018/0156747 A1 | 6/2018 | Le Neel et al. |

FOREIGN PATENT DOCUMENTS

| | | | | |
|---|---|---|---|---|
| EP | 3029648 A1 * | 6/2016 | ............ | G01N 15/06 |
| WO | 2017/122090 A1 | 7/2017 | | |
| WO | WO 2017/218763 A1 | 12/2017 | | |
| WO | WO-2017218763 A1 | 12/2017 | | |

OTHER PUBLICATIONS

Extended European Search Report dated Jun. 13, 2019, issued during the prosecution of European Patent Application No. EP 19151826.5.
Extended European search report for European Patent Application No. 18176075.2, dated Jul. 30, 2018.
Extended European search report for European Patent Application No. 18176082.8, dated Jul. 31, 2018.
Extended European Search Report dated May 26, 2020, issued during the prosecution of European Patent Application No. EP 20154106.7.

* cited by examiner

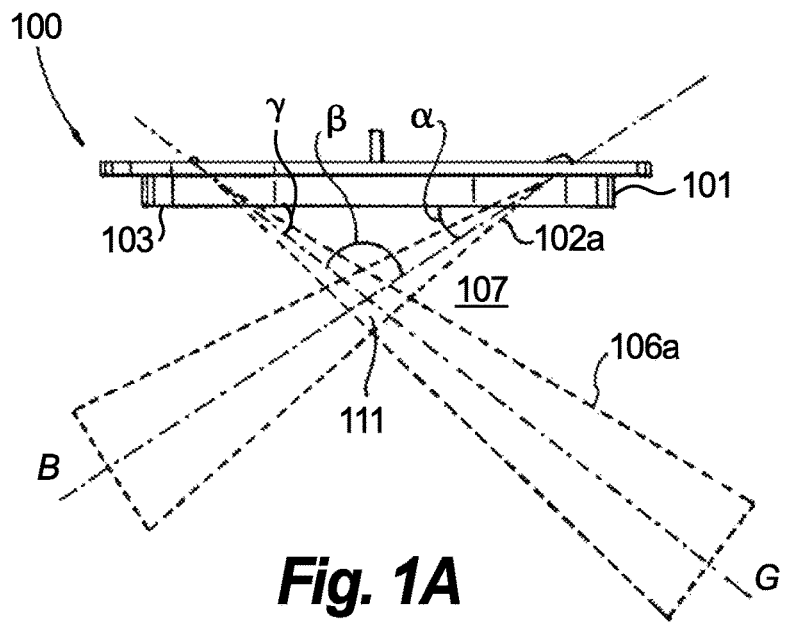
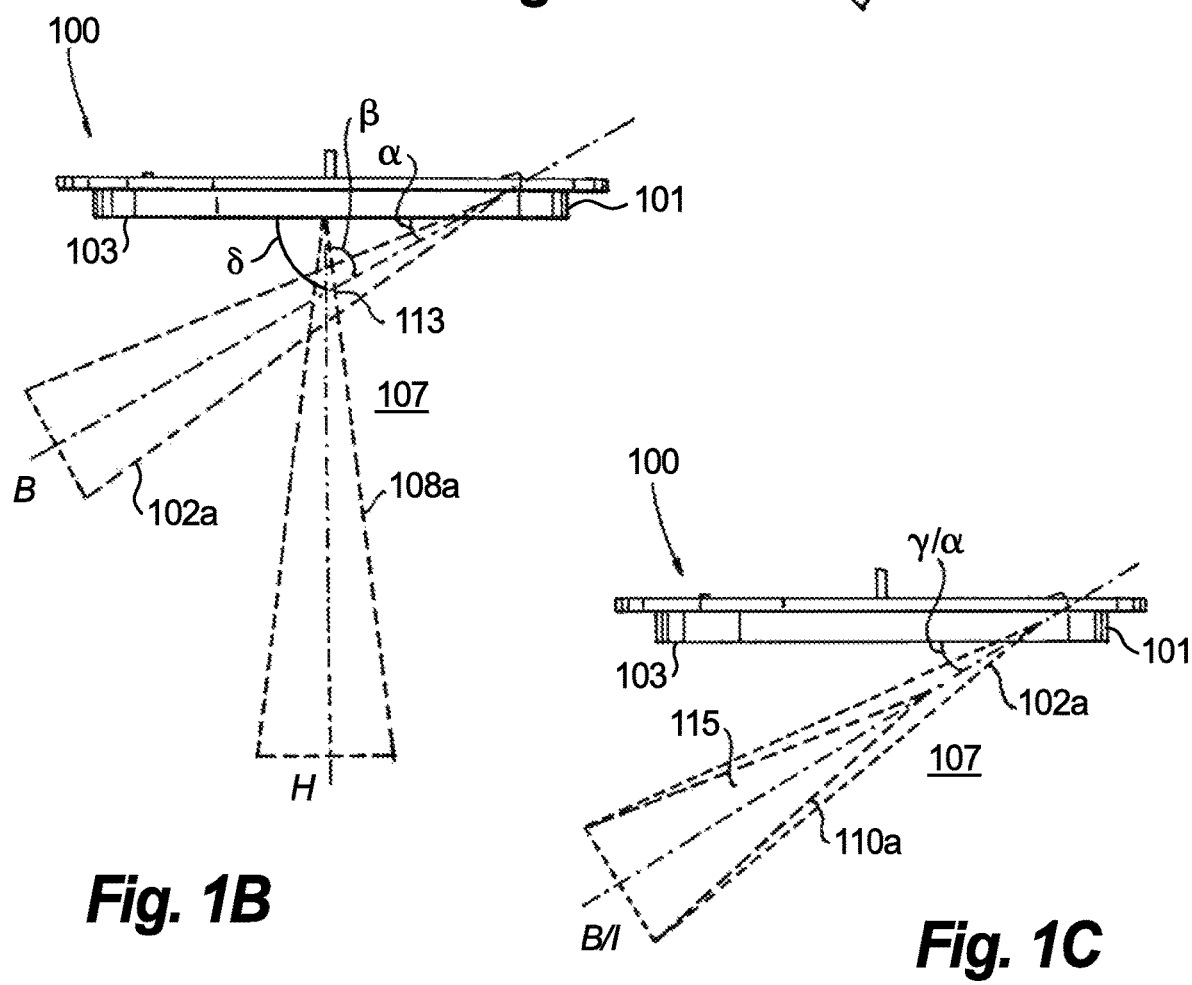

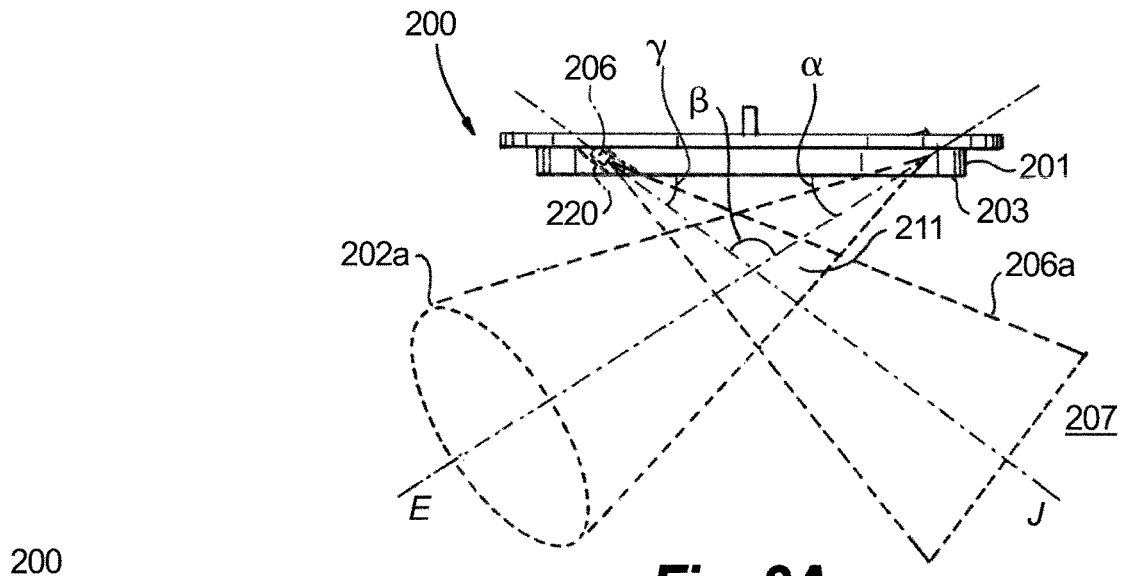
*Fig. 3A*
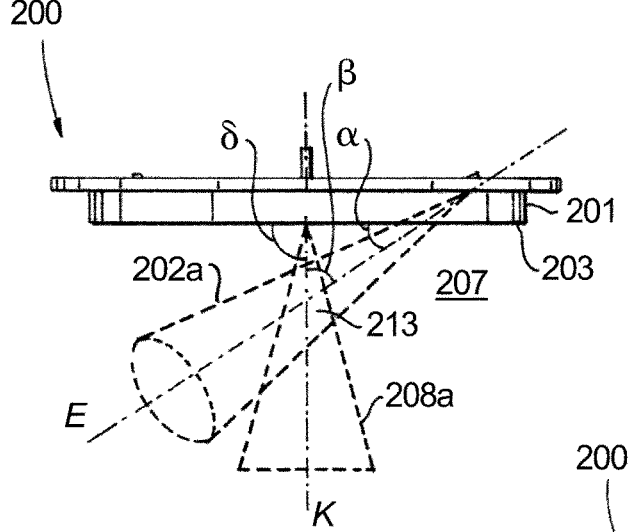
*Fig. 3B*
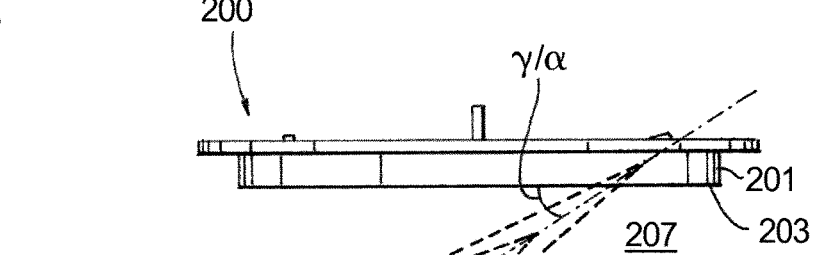
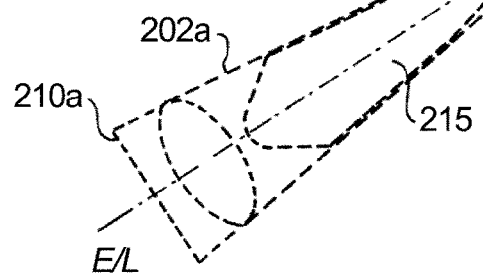
*Fig. 3C*

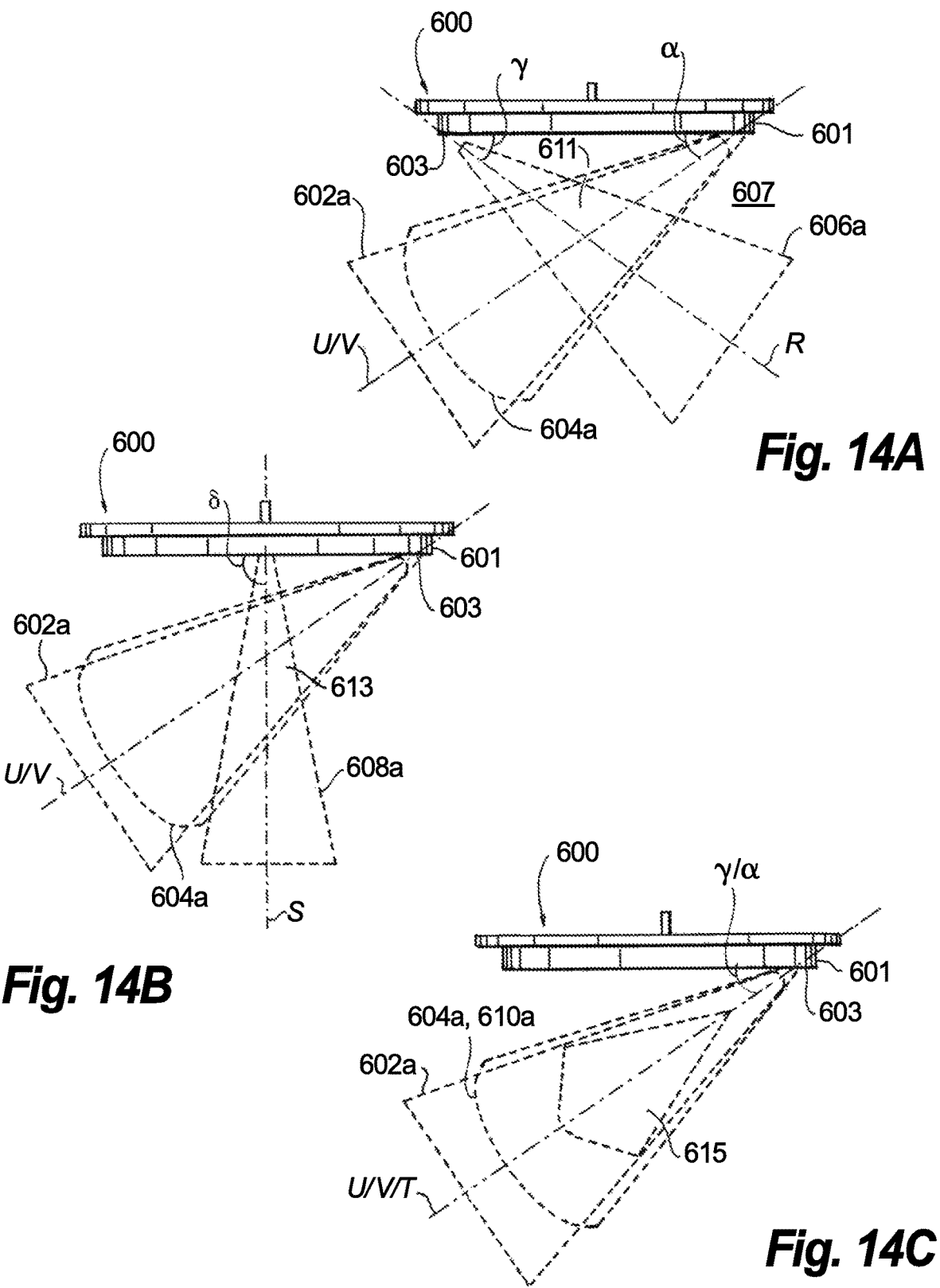

SYSTEMS AND METHODS FOR CHAMBERLESS SMOKE DETECTION AND INDOOR AIR QUALITY MONITORING

CROSS-REFERENCE TO RELATED APPLICATIONS

This application is a continuation-in-part of U.S. patent application Ser. No. 15/871,931, filed Jan. 15, 2018, the contents of which are incorporated by reference herein in their entirety. This application claims the benefit of earlier filed U.S. Provisional App. No. 62/517,614, filed on Jun. 9, 2017, and U.S. Provisional App. No. 62/515,039 filed on Jun. 5, 2017, the contents of both applications are incorporated by reference herein in their entirety. This application is a continuation-in-part application of PCT/US2017/037659, filed on Jun. 15, 2017, which claims the benefit earlier filed U.S. Provisional App. No. 62/350,418 filed on Jun. 15, 2016, the contents of both applications are incorporated by reference herein in their entirety.

BACKGROUND OF THE INVENTION

1. Field of the Invention

The present disclosure relates to smoke detectors, and more particularly to chamberless smoke detectors and air quality detection and monitoring for aircraft.

2. Description of Related Art

Smoke sensors, such as smoke detectors used on aircraft, often located inside of a cabin, bathroom or cargo area, use near infrared light, or lights of other wavelengths, scattering inside a small plastic chamber located inside of the enclosure, with inlets of controlled dimensions to prevent entry of unwanted particles. However, some unwanted airborne particles do make their way into the chamber, causing false alarms. Over time, these particles may also collect at the inlets of the sensor chamber, making it more difficult for smoke particles to diffuse into the chamber. Additionally, particles collecting on chamber surfaces may increase sensitivity thereby resulting in more frequent false or nuisance alarms. Moreover, the enclosure of some detectors can be covered over, thereby inhibiting the detection capabilities.

To alleviate some of these issues, chamber-less smoke detectors may be used. However, with no chamber there is not a physically well-protected measurement volume, meaning a well-defined operational strategy is key to maintaining measurement integrity. Additionally, the lights used for detection are in some cases nearly constantly on and may provide a nuisance to users, and consumes more power. Therefore, there exists a need for improved chamber-less smoke detection. Further, it is often desired to monitor indoor air quality of the same space where the smoke sensors are deployed by detecting the presence of PM2.5 and PM10 particles. The conventional techniques have been considered satisfactory for their intended purpose. However, there is a need for improved chamberless smoke detectors and air quality detection and monitoring for aircraft. This disclosure provides a solution for this need.

SUMMARY OF THE INVENTION

A system for detection and monitoring includes one or more light sources configured to emit light into a monitored space. At least one of the light sources is configured to emit a respective emission cone having a respective emission cone axis. One or more light sensing devices are configured to receive scattered light. At least one of the one or more light sensing devices defines a respective acceptance cone having a respective acceptance cone axis. The emission cone axis of the emission cone, and/or the acceptance cone axis of the light sensing device is angled toward the other. A processor is operatively connected to the at least one light sensing devices to evaluate the scattered light for the presence of particulates in the monitored space.

In some embodiments, the one or more light sources includes two light sources each emitting a respective emission cone. The respective emission cone axes can be parallel to one another as viewed from a bottom side of a detector housing. The emission cone axis and the acceptance cone axis can intersect one another as viewed from a bottom side of a detector housing, but may not intersect one another in all dimensions. In some embodiments, at least one emission cone axis and at least one acceptance cone axis intersect one another in all dimensions. It is contemplated that the one or more light sources includes two light sources. At least one of the light sensing devices can be positioned between the two light sources. An angle between the emission cone axis and the acceptance cone axis can be between zero and 180 degrees. It is contemplated that the emission cone axis of the light source and the acceptance cone axis of the light sensing device can be parallel to one another as viewed from a bottom side of a detector housing, and/or in all dimensions.

The one or more light sources can be configured to emit light of different wavelengths. A first light source of the one or more light sources can be configured to emit light at a first wavelength in a UV spectrum and/or a visible spectrum. A second light source of the one or more light sources can be configured to emit light at a second wavelength in the visible spectrum and/or an IR spectrum.

In some embodiments, the system includes a polarizing filter optically coupled to at least one of the one or more light sensing devices, or the one or more light sources. An airborne particle type can be discriminated via the use of the polarizing filter. In some embodiments, the system includes a detector housing. The one or more light sources and the one or more light sensing devices can be positioned within the detector housing. The detector housing can include apertures. Each aperture can be associated with a respective one of the light sources or the light sensing devices. Each aperture can define a respective aperture axis. In some embodiments, the aperture axis of at least one aperture associated with one of the light sources is angled with respect to the aperture axis of at least one of the apertures associated with one of the light sensing devices. In some embodiments, the system includes at least two light sensing devices. The at least two apertures associated with the at least two light sensing devices can share a common centerline axis. At least two of the one or more light sensing devices can share a common centerline axis. The processor can be configured to evaluate scattered light and/or fluorescence to detect and monitor for target gases, particulate contaminants, PM2.5, PM10, microbial contaminants, and/or smoke.

In accordance with another aspect, a method of operating a system for detection and monitoring includes emitting light from one or more light sources of the system into a monitored space. Emitting light includes emitting light from each of the one or more light sources as respective emission cones. Each emission cone includes an emission cone axis. The method includes detecting scattered light with one or more light sensing devices of the system. At least one of the one or more light sensing devices defines a respective acceptance cone having an acceptance cone axis. At least one of the emission cone axis or the acceptance cone axis is angled toward the other and wherein the detection of scattered light is indicative of one or more particulates in the monitored space.

In some embodiments, one or more light sources includes two light sources. The emission cone axes of the two light sources can be parallel to one another. It is contemplated that in some embodiments, the emission cone axis and the acceptance cone axis intersect one another as viewed from a bottom side of a detector housing, but may not intersect one another in all dimensions. In accordance with some embodiments, the emission cone axis of the light source and the acceptance cone axis of the light sensing device are parallel to one another in all dimensions.

Emitting light from the one or more light sources can include emitting a first light having a first wavelength from one of the light sources. The first wavelength can be in at least one of the UV spectrum or the visible spectrum. Emitting light from the one or more light sources can include emitting a second light having a second wavelength from another one of the light sources. The second wavelength can be in at least one of the visible spectrum or the IR spectrum. The method can include polarizing light entering into at least one of the one or more light sensing devices with a polarizing filter. The method can include polarizing light exiting at least one of the one or more light sources with a polarizing filter. The method can include determining and monitoring for target gases, particulate contaminants, microbial contaminants and/or other conditions, in addition to smoke.

In accordance with another aspect, a system for detection and monitoring includes one or more light sources configured to emit light into a monitored space and at least two light sensing devices configured to receive scattered light. The at least two light sensing devices are aligned along a common axis. The system includes a processor operatively connected to the at least one light sensing devices to evaluate the scattered light for presence of particulates in the monitored space. In some embodiments, the one or more light sources includes two light sources. Each light source can be an equal distance from the common axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1A is a schematic depiction of a side view of an embodiment of a system for particulate monitoring constructed in accordance with the present disclosure, showing an overlap region between an emission cone and an acceptance cone that forms a sensing volume;

FIG. 1B is a schematic depiction of the system of FIG. 1A, showing an overlap region between an emission cone and a second acceptance cone that forms a second sensing volume;

FIG. 1C is a schematic depiction of the system of FIG. 1A, showing an overlap region between an emission cone and a third acceptance cone that forms a third sensing volume;

FIG. 3A is a schematic depiction of a side view of another embodiment of a system for particulate monitoring constructed in accordance with the present disclosure, showing an overlap region between an emission cone and an acceptance cone that forms a sensing volume;

FIG. 3B is a schematic depiction of the system of FIG. 3A, showing an overlap region between an emission cone and a second acceptance cone that forms a second sensing volume;

FIG. 3C is a schematic depiction of the system of FIG. 3A, showing an overlap region between an emission cone and a third acceptance cone that forms a third sensing volume;

FIG. 14A is a schematic depiction of a side view of the system of FIG. 13A, showing a forward-scatter acceptance cone and first and second emission cones, and the overlapping regions between the emission cones and the forward-scatter acceptance cone that forms two sensing volumes;

FIG. 14B is a schematic depiction of a side view the system of FIG. 13A, showing a mid-scatter acceptance cone and first and second emission cones, and the overlapping regions between the emission cones and the mid-scatter acceptance cone that forms two sensing volumes; and FIG. 14C is a schematic depiction of a side view the system of FIG. 13A, showing a back-scatter acceptance cone and first and second emission cones, and the overlapping regions between the emission cones and the back-scatter acceptance cone that forms two sensing volumes.

DETAILED DESCRIPTION OF THE PREFERRED EMBODIMENTS

Figure 2A:
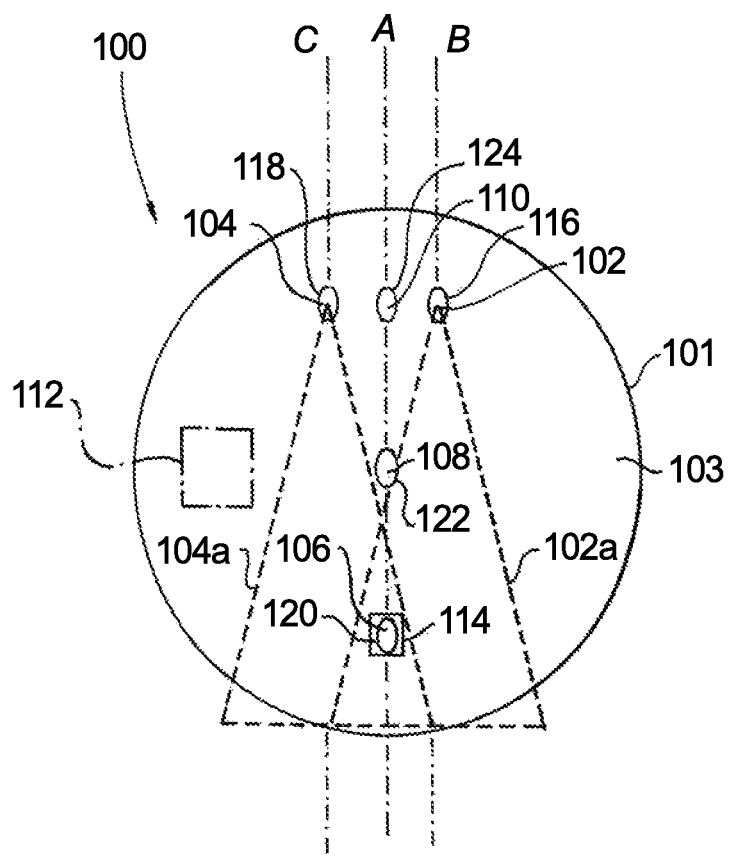
FIG. 2A is a bottom view of the system of FIGS. 1A-1C, showing a plurality of light sources and light sensing devices and first and second emission cones.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIGS. 1A-1B and is designated generally by reference character 100. Other embodiments of systems in accordance with the disclosure, or aspects thereof, are provided in FIGS. 2A-14C, as will be described. The systems and methods described herein can be used in systems for chamberless particulate monitoring including smoke detection and air quality monitoring in aircraft, such as aircraft cabins, cargo areas, and the like.

As shown in FIGS. 1A-1C, a chamberless system for particulate monitoring 100 utilizes a photoelectric method for detection of particulates into a monitored space 107. The monitored space 107 is in proximity to a housing 101 of system 100 and extends into the environment being monitored. In buildings, space 107 would extend into a room, duct, elevator shaft, and the like. In an aircraft, space 107 would extend into a cargo bay, aircraft cabin, or avionics bay. The monitored space 107 is dependent upon the spatial placement of light emitting and detection elements within 100.

With reference now to FIG. 2A, a bottom surface 103 of housing 101 is shown. System 100 includes light sources 102 and 104 configured to emit light into a monitored space. The first light source 102 and the second light source 104 may include a light emitting diode (LED). The first light source 102 and the second light source 104 may emit light at one or more wavelengths into monitored space 107. In an embodiment, the first light source 102 may emit light of wavelengths characteristic of infrared light, and the second light source 104 may emit light of wavelengths characteristic of blue visible light. The infrared light may be used in the detection and false alarm discrimination of smoke, and the blue visible light may be used in the false alarm discrimination of smoke. Additionally, in some embodiments, a combination of infrared light and ultra-violet light may be used. The light emitted from first and second light sources 102 and 104, respectively, is indicated schematically by the first and second emission cones 102a and 104a, respectively. Emission cones 102a and 104a define emission cone axes B and C that are parallel to one another. Moreover, as shown in FIGS. 1A-1C, emission cones 102a and 104a extend downwards at an angle α of about 25 degrees with respect to bottom surface 103 of housing 101. Angle α can range from 1 degree to 90 degrees in some embodiments, and 5 degrees to 40 degrees in some cases. This also applies to 202a and 204a, 402a and 404a, 502a and 504a, and 602a and 604a, as described below. The downward angle for 102a, 104a, 202a, 204a, 402a, 404a, 502a, 504a, 602a and 604a are independent parameters. The angle a for 102a, 104a, 202a, 204a, 402a, 404a, 502a, 504a, 602a and 604a can be the same at 25 degrees, or some can be greater or less than 25 degrees.

Figure 2B:
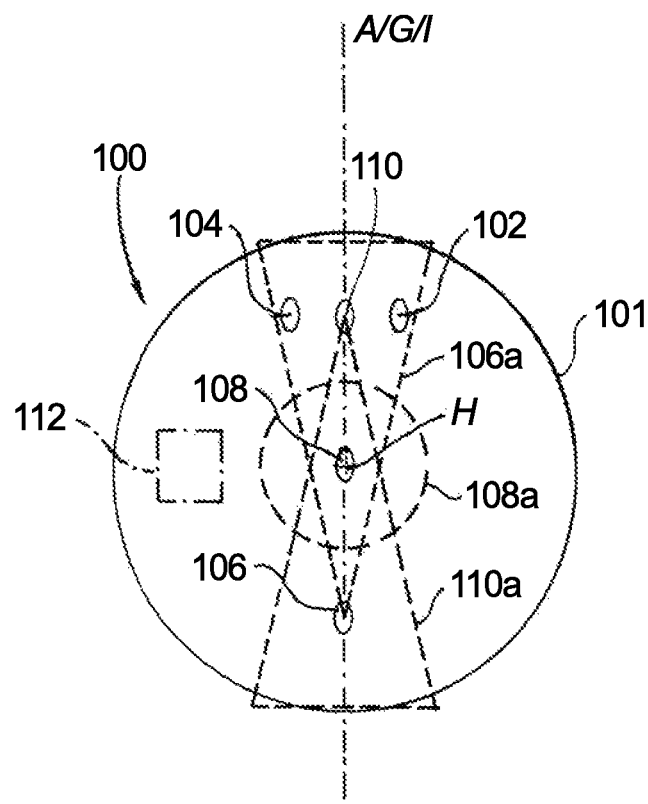
FIG. 2B is a bottom view of the system of FIGS. 1A-1C, showing a plurality of light sources and light sensing devices and a plurality of acceptance cones associated with the light sensing devices.

With continued reference to FIG. 2A-2B, the system 100 includes three light sensing devices 106, 108 and 110 configured to receive scattered light, e.g. light originally emitted from the light sources 102 and/or 104 and then scattered off any airborne particles, or other obstructions. Light sensing devices 106, 108 and 110 can be photodiodes (PDs), and/or light sensing devices such as Avalanche PhotoDiodes (APDs), Multi-Pixel Photon Counters (MPPCs), and the like. Each light sensing device 106, 108 and 110 defines an acceptance cone 106a, 108a and 110a, respectively. Each acceptance cone 106a, 108a and 110a has an acceptance cone axis G, H and I, respectively, as shown in FIGS. 1A-1C. Each acceptance cone axis is the axis of symmetry for each acceptance cone 106a, 108a and 110a. The same is true for the other acceptance cones in the other embodiments described below. Moreover, as shown in FIGS. 1A-1C, acceptance cones 106a and 110a extend downwards at an angle γ of about 25 degrees with respect to bottom surface 103 of housing 101. Angle y can range from 1 degree to 90 degrees in some embodiments, and 5 degrees to 40 degrees in some cases. This also applies to acceptance cones 206a and 210a, 406a and 410a, 506a and 510a, 606a and 610a as described below. The downward angle for 106a, 110a, 206a, 210a, 406a, 410a, 506a, 510a, 606a, 610a are independent parameters. The angle γ for 106a, 110a, 206a, 210a, 406a, 410a, 506a, 510a, 606a, 610a can be the same at 25 degrees, or some can be greater or less than 25 degrees. In addition, FIG. 1B shows acceptance cone 108a extending downwards at an angle δ of about 90 degrees with respect to bottom surface 103 of housing 101. However, angle δ it can be more or less than 90 degrees. This also applies to angle δ for acceptance cones 208a, 408a, 508a, and 608a, as described below. The downward angle δ for acceptance cones 108a, 208a, 408a, 508a, and 608a are independent parameters. The angle δ for 108a, 208a, 408a, 508a, and 608a can be the same at 90 degrees, or some can be greater or less than 90 degrees.

With continued reference to FIGS. 2A-2B, the light sensing devices 106, 108 and 110 are configured to measure signals, e.g. light that has been emitted from the first light source 102 and the second light source 104 and scattered and/or fluoresced by particulates/objects in the environment. The sensing volume is defined as the overlap between an emission cone such as 102a or 104a and an acceptance cone such as 106a, 108a, or 110a. The sensing volume is dependent on the position of the light sensing devices 106, 108, and 110 and the light sources 102 and 104 as well as the shape of their respective emission and acceptance cones. Because the emission cone axes are parallel to the acceptance cone axes when viewed from bottom surface 103 of housing 101, moving the emission cone axes closer to the acceptance cone axes will increase the overlap of the emission cones and acceptance cones, and therefore increase the sensing volume. An increase in the size of a sensing volume, while not moving the sensing volume away from the vertices of either the emission cone or acceptance cone, will increase the sensitivity of the detector to any particulate or solid object in the field of view. By having the light sensing devices 106, 108 and 110 along the same central axis A and the two light sources 104 and 102 on each side, sensing can be better achieved as compared with sensors that have light sensing devices, e.g. light sensing devices 106, 108, both offset on the same side because there is greater overlap between the second emission cone, 104a, and acceptance cones 106a, 108a and 110a. For example, system 100 provides a greater overlap between second light emission cone 104a and acceptance cones 106a, 108a, as compared to systems where, instead of being aligned with light sensing device 110 and equal distance from light sources 104 and 102, light sensing devices 106 and 108 are aligned along a common axis with light source 102. The multi-wavelength, multi-angle information is useful in discriminating solid objects from particulates, as well as, nuisance particulates from smoke, and also for particle sizing for indoor air quality measurements. The detection capability of system 100, even in cargo spaces, provide robust detection capabilities to detect various particles and/or to discriminate between particle types.

As shown in FIGS. 1A-2B, in an embodiment, light sensing device 106 is a first light sensing device, the light sensing device 108 is a second light sensing device, and the light sensing device 110 is a third light sensing device. The distance between light sensing device 106, and/or its respective aperture, and light source 102, and/or its respective aperture, is the same as the distance between light sensing device 106, and/or its respective aperture, and light source 104, and/or its respective aperture. The same is true for light sensing devices 108 and 110. The overlap of the field of view, e.g. acceptance cones 106a, 108a and 110a, with the first emission cone 102a form different overlapping sensing volumes 111, 113 and 115, respectively. Similar sensing volumes are also formed by the overlap of the acceptance cones 106a, 108a, and 110a with the second emission cone 104a (which are not shown in most of the views for sake of clarity). Ultimately, in 3D space there will be a total of six different overlapping sensing volumes formed by the overlap between emission cones and acceptance cones, some of which may overlay with one another. When viewed from the side as in FIGS. 1A-1C, the two regions associated with a given acceptance cone (one for each emission cone) would appear to be the same, however, in 3D space these would be different. As viewed from the bottom of the detector housing 101, e.g. the view of FIGS. 2A and 2B, it is shown that the acceptance cone axes G, H and I of the acceptance cones 106a, 108a and 110a, do not intersect with the emission cone axes B and C of emission cones 102a and 104a, respectively. Each emission cone axis is the axis of symmetry for each emission cone 102a and 104a. The same is true for the other emission cones in the other embodiments described below. Instead, as viewed from the bottom of the detector housing 101, the acceptance cone axes G and I are parallel to the axes of symmetry B and C and the acceptance cone axis H is perpendicular to the axes of symmetry B and C. The emission cones and acceptance cones themselves, however, do overlap (in 3D space), as described below by the overlapping sensing regions.

As shown in FIG. 1A, light sensing device 106 is a forward scatter light sensing device and defines an acceptance cone 106a having an acceptance cone axis G. Acceptance cone axis G and the emission cones 102a and 104a have an angle of coincidence β of 130 degrees, for example. Those skilled in the art will readily appreciate, however, that the angle of coincidence for between each of the emission cones 102a and 104a and acceptance cone 106a can be different. For example, emission cone 102a can be angled farther downward from bottom surface of housing 101 than emission cone 104a, making the angle of coincidence between acceptance cone 106a different for each of emission cones 102a and 104a. The same is true for the other emission cones and acceptance cones described herein. Acceptance cone 106a overlaps with first emission cone 102a and second emission cone 104a. The overlaps between acceptance cone 106a and first and second emission cones 102a and 104a, respectively, each defines respective forward-scatter sensing volumes 111 (only the sensing volume for the overlap between acceptance cone 106a and first emission cone 102a is shown in FIG. 1A for sake of clarity). The overlap between acceptance cones 106a, 108a and 110a and second emission cone 104a is not shown in the view of FIGS. 1A-1C for sake of clarity as, in the side view shown, it would be directly in front of the overlap with emission cone 102a (which is shown). FIGS. 1A-1C (and the side views described throughout this application) are left-side, top-up views of the schematic plan bottom views shown. For example, FIGS. 1A-1C are left-side, top-up (bottom-down) views of the schematic plan bottom view of housing 101 as oriented in FIGS. 2A and 2B.

As shown in FIG. 1B, light sensing device 108 is referred to as a mid-scatter or side-scatter light sensing device and defines an acceptance cone 108a having an acceptance cone axis H. In the embodiment shown in FIG. 1B, acceptance cone axis H and the acceptance cones 102a and 104a have an angle of coincidence β of 65 degrees. Those skilled in the art will readily appreciate, however, that the angle of coincidence for between each of the emission cones 102a and 104a and acceptance cone 108a can be different, similar to how it is described above for acceptance cone 106a. Acceptance cone 108a overlaps with first emission cone 102a and second emission cone 104a. These overlaps define respective mid-scatter sensing volumes 113 (one of which is visible in FIG. 6A). Only sensing volume 113 for the overlap between acceptance cone 108a and first emission cone 102a is shown in FIG. 1B for sake of clarity. As described above, the overlap for second emission cone 104a and acceptance cone 108a that also forms one of sensing volumes 113 is not shown the view of FIG. 1B.

As shown in FIG. 1C, light sensing device 110 is a back-scatter light sensing device and defines an acceptance cone 110a that defines an acceptance cone axis I. Acceptance cone axis I is substantially parallel to axes of symmetry B and C and defines a zero degree angle of coincidence with both axes, for example. However, in other embodiments the angle of coincidence can be greater than zero. Acceptance cone 110a overlaps with first emission cone 102a and emission cone 104a. The overlaps defines two back-scatter sensing volumes 115. Only sensing volume 115 for the overlap between acceptance cone 108a and first emission cone 102a is shown in FIG. 1C for sake of clarity. As described above, the overlap for second emission cone 104a and acceptance cone 110a that also forms one of sensing volumes 115 is not shown the view of FIG. 1C. The angle of coincidence β can vary depending on the downward angles for 102a, 104a, 202a, and 204a, as well as, 106a, 108a, 110a, 206a, 208a, and 210a.

The system 100 can include a polarizing filter 114 optically coupled to a light sensing device 106. Polarizing filter 114 allows an additional way to discriminate between airborne particle types. Similarly one or more respective polarizing filters 114 can be optically coupled to light sensing devices 108 and 110 and light sources 102 and 104. System 100 includes a housing 101 in which light sources 102 and 104 and light sensing devices 106, 108 and 110 are operatively mounted. For example, some embodiments include surface mount light sources and light sensing devices that are directly mounted to a circuit board within an interior portion of housing 101. Light pipes can be used to operatively direct the emission cones and acceptance cones of the light sources and light sensing devices from an aperture in the housing, through the housing, to direct the emission cones and acceptance cones to/from the surface mounted optical elements. If mounted at the desired angle on the circuit board (which could be conformally shaped with flexible circuit boards), light pipes may not be needed.

However, a transparent window over the apertures may be used to allow the light to pass through the housing, while protecting the board and optical components from the external environment. In any case, a transparent window (composed of borosilicate, sapphire, Gorilla Glass, polycarbonate, etc.) could generally be used for either embodiment to protect the circuit and optical components. The housing 101 can include apertures 116, 118, 120, 122 and 124 associated with the given light sources 102 and 104 and light sensing devices 106, 108 and 110, respectively.

A processor 112 is operatively connected to the light sensing devices 106, 108 and 110 and is configured to evaluate the scattered light for presence of one or more conditions, such as presence of solid objects, nuisance particulates, smoke particulates, and indoor air quality particulates in the monitored space 107. This includes, but is not limited to, pollen, microbials, gases, and the like. The processor 112 is operatively connected to the plurality of light sources 102 and 104 and the plurality of sensors 106, 108 and 110. The processor 112 includes a memory (not shown) capable of storing executable instructions. The processor 112 can execute the instructions, such as in connection with one or more applications, processes or routines to analyze the signals detected by the plurality of sensors to make alarm decisions, for example, after preset threshold levels, or threshold ratio of levels, are reached. For example, a ratio between particulates detected by the sensing volumes can be used to help discriminate between nuisances and alarm scenarios.

Figure 4A:
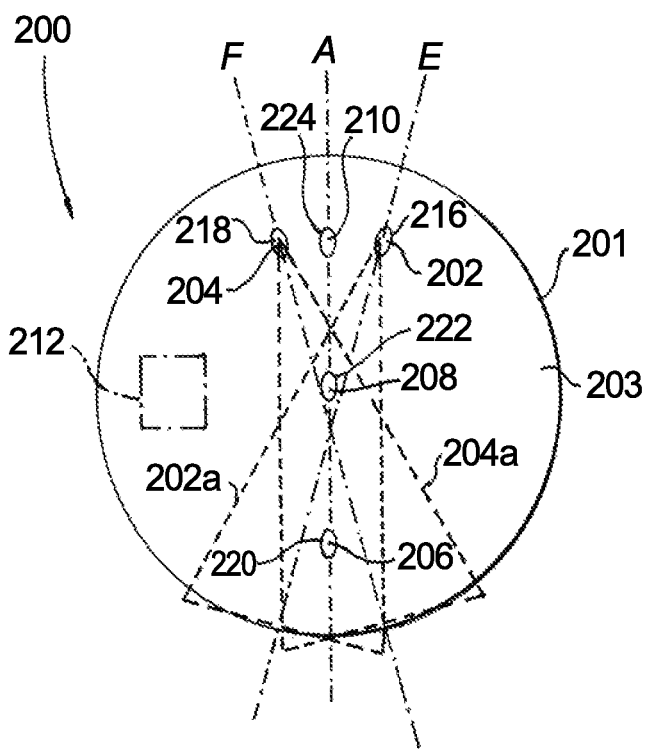
FIG. 4A is a bottom view of the system of FIGS. 3A-3C, showing a plurality of light sources and light sensing devices and first and second emission cones.

As shown in FIGS. 3A-3B and 4A, another embodiment of a system for particulate monitoring 200 includes a plurality of light sources 202 and 204 and a plurality of light sensing devices 206, 208 and 210. Light sensing devices 206, 208 and 210 are similar to light sensing devices 106, 108 and 110 described above and the description provided above with respect to light sensing devices 106, 108 and 110 readily applies to light sensing devices 206, 208 and 210. System 200 includes a housing 201, similar to housing 101, having a bottom surface 203. A processor 212 is operatively connected to the light sensing devices 206, 208 and 210 and is configured to evaluate the scattered light for presence of one or more conditions, such as presence of solid objects, nuisance particulates, smoke particulates, and indoor air quality particulates in a monitored space 207, similar to processor 112. Housing 201 includes apertures 216, 218, 220, 222 and 224 associated with the given light sources 202 and 204 and light sensing devices 206, 208 and 210, respectively. In the system 200, the light emitted from light sources 202 and 204 is indicated schematically by emission cones 202a and 204a, respectively. Light sources 202 and 204 are similar to light sources 102 and 104 except that light sources 202 and 204 are angled toward light sensing devices 206, 208 and 210. The light emitted from first and second light sources 202 and 204, respectively, is indicated schematically by the first and second emission cones 202a and 204a, respectively. Emission cone 202a defines an emission cone axis E and emission cone 204a defines emission cone axis F.

With continued reference to FIGS. 3A-3C and 4A, the first light source 202 and the second light source 204 may include a light emitting diode (LED) and may emit light at one or more wavelengths into a monitored space 207, similar to light sources 102 and 204. The monitored space 207 is similar to that described above with respect to FIG. 1. Similar to first light source 102 and second light source 104, first light source 202 may emit light of wavelengths characteristic of infrared light, and the second light source 204 may emit light of wavelengths characteristic of blue visible light. The infrared light may be used in the detection and false alarm discrimination of smoke, and the blue visible light may be used in the false alarm discrimination of smoke. Additionally, in some embodiments, a combination of infrared light and ultra-violet light may be used. System 200 can also include a polarizing filter, similar to filter 114.

Figure 4B:
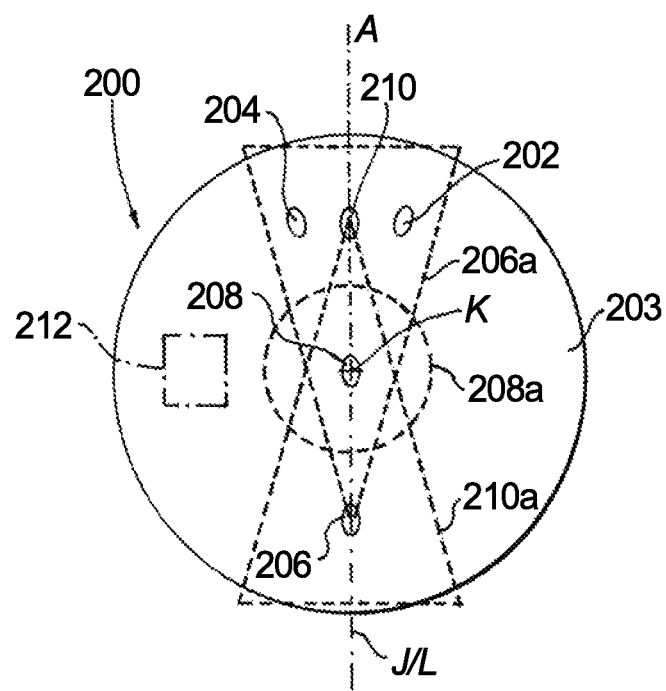
FIG. 4B is a is a bottom view of the system of FIGS. 3A-3C, showing a plurality of light sources and light sensing devices and a plurality of acceptance cones, wherein each acceptance cone is associated with a respective one of the light sensing devices.

With continued reference to FIGS. 3A-3C and 4A-4B, light sensing devices 206, 208 and 210 can be photodiodes (PDs), and/or light sensing devices such as Avalanche PhotoDiodes (APDs), Multi-Pixel Photon Counters (MPPCs), and the like. Each light sensing device 206, 208 and 210 defines an acceptance cone 206a, 208a and 210a, respectively. Each acceptance cone 206a, 208a and 210a has an acceptance cone axis J, K and L, respectively, as shown in FIGS. 3A-3C and 4B. The overlap of the acceptance cones 206a, 208a and 210a, with the first and second emission cones 202a and 204a form different overlapping sensing volumes. Acceptance cones 206a, 208a and 210a and their axes (discussed more below) are very similar to acceptance cones 106a, 108a and 110a depicted in FIG. 2B for system 100. Acceptance cones 206a, 208a and 210a and their respective acceptance axes J, K and L are shown in FIG. 4B. When viewing FIGS. 4A and 4B together it is evident that one or more of acceptance axes J, K or L intersect one or more of emission axes E or F when viewed from a bottom side of a detector housing and the emission cone axes and acceptance cone axes are projected on to a 2D plane, but they may or may not intersect one another in three dimensions.

As shown in FIG. 3A, light sensing device 206 is a forward scatter light sensing device and defines an acceptance cone 206a having an acceptance cone axis J. Acceptance cone axis J and the emission cone axes E and F have an angle of coincidence β of 130 degrees, for example. Acceptance cone 206a overlaps with first emission cone 202a and second emission cone 204a (204a is not shown in the view of FIG. 3A as it is overlapped by first emission cone 202a). The overlap between acceptance cone 206a and first emission cone 202a defines a forward-scatter sensing volume 211. Additionally, there is a separate overlap that defines a second forward-scatter sensing volume between acceptance cone 206a and second emission cone 204a that is not shown in the view of FIG. 3A. The overlap between acceptance cones 206a, 208a and 210a and second emission cone 204a (and the sensing volumes formed thereby) are not shown in the view of FIGS. 3A-3C for sake of clarity as, in the side view shown, these sensing volumes would be directly in front of the overlap with emission cone 202a (which is shown).

As shown in FIG. 3B, light sensing device 208 is referred to as a mid-scatter or side-scatter light sensing device and defines an acceptance cone 208a having an acceptance cone axis K. Acceptance cone axis K and emission cone axes E and F have an angle of coincidence β of 65 degrees, for example. Acceptance cone 208a overlaps with first emission cone 202a and second emission cone 204a. The overlap between acceptance cone 208a and first emission cone 202a defines a mid-scatter sensing volume 213. As discussed above, the overlap between acceptance cone 208a and second emission cone 204a (and the sensing volume formed thereby) is not shown in the view of FIG. 3B for sake of clarity as, in the side view shown, this sensing volume would be directly in front of the overlap with emission cone 202a (which is shown). The second sensing volume 213 between acceptance cone 208a and second emission cone 204a is, however, schematically shown in FIG. 6B.

As shown in FIG. 3C, light sensing device 210 is a backscatter light sensing device and defines an acceptance cone 210a that defines an acceptance cone axis L. Emission cone axis E of emission cone 202a is extending out of the page as oriented in FIG. 3C. Acceptance cone 210a overlaps with emission cone 202a and, in the view of FIG. 3C due to the zero degree angle of coincidence, acceptance cone axis L and emission cone axis E appear co-linear. Acceptance cone 210a overlaps with first emission cone 202a and second emission cone 204a. The overlap between acceptance cone 210a and first emission cone 202a defines a back-scatter sensing volume 215. As described above, a similar back-scatter sensing volume is formed between acceptance cone 210a and second emission cone 204a, but is not shown for sake of clarity.

By having at least one light source, in this case, the emission cone axes E and F of light sources 202 and 204 angled toward at least one of the acceptance cone axes of the light sensing devices, in this case acceptance cone axes J, K and L, the backscatter sensing volumes 215 (for both 202a and 204a) are truncated and allow for better sensing at a close region instead of extending into the entire environment. This is particularly helpful in aerospace applications where large amounts of cargo may be stored in the monitored space and may be very close, e.g. right under, a given detector system 100 or 200. In addition, angling at least one of emission cone axes E and F of the light sources 202 and 204 toward the mid and forward light sensing devices 206 and 208, respectively, will increase the forward and mid sensing volumes because of the increase in the overlap between the emission cones 202a and 204a and acceptance cones 206a and 208a. The detection capability of system 200, even in cargo spaces such as those described above, provide robust detection capabilities to detect various particles and/or to discriminate between particle types.

Figure 8A:
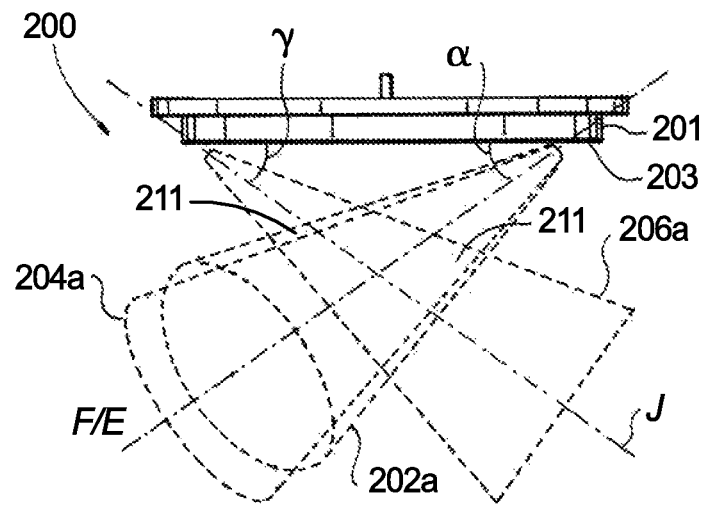
FIG. 8A is schematic depiction of the system of FIG. 3A, showing a forward-scatter acceptance cone and first and second emission cones, and the overlapping regions between the emission cones and the forward-scatter acceptance cone that forms two sensing volumes.
Figure 8B:
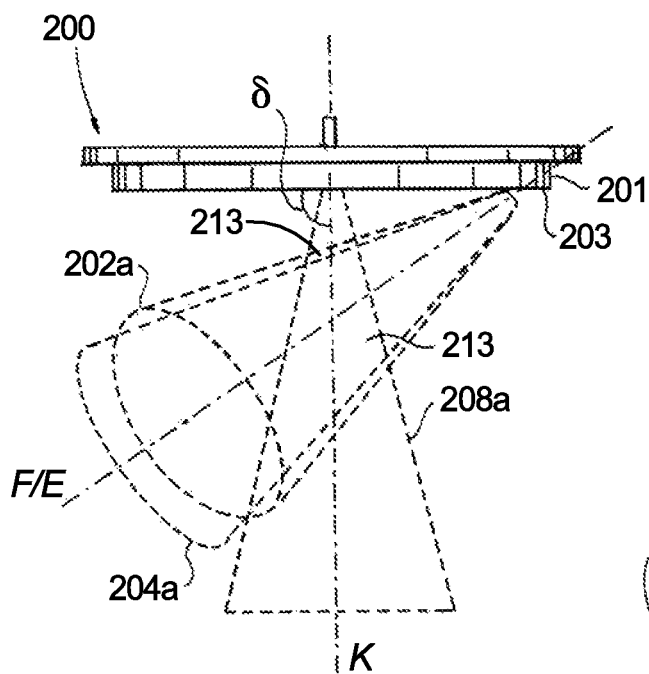
FIG. 8B is a schematic depiction of the system of FIG. 3B, showing a mid-scatter acceptance cone and first and second emission cones, and overlapping regions between the emission cones and the mid-scatter acceptance cone that forms two sensing volumes.
Figure 8C:
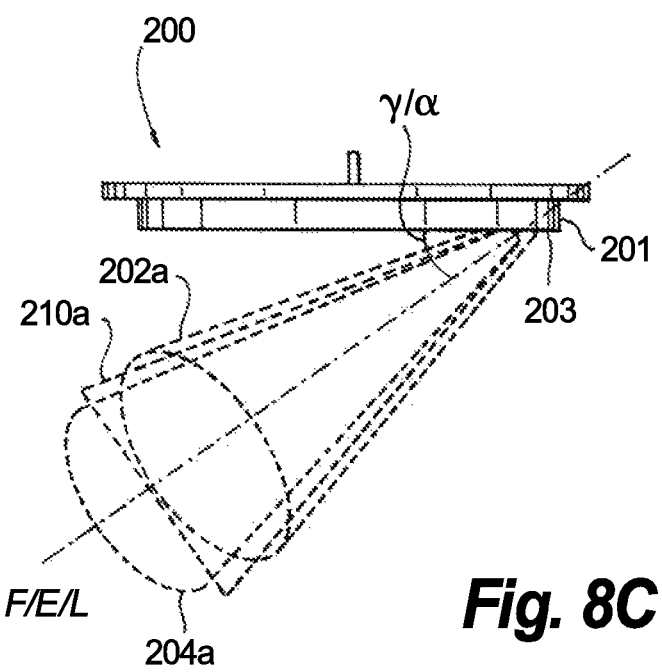
FIG. 8C is a schematic depiction of the system of FIG. 3C, showing a back-scatter acceptance cone and first and second emission cones, and the overlapping region between the emission cones and the back-scatter acceptance cone that forms two sensing volumes.

FIG. 8A-8C showing a schematic view of the system of FIGS. 3A-3C but with three-dimensional renderings of emission cones 202a and 204a as they overlap with a given acceptance cone. FIG. 8A shows emission cones 202a and 204a overlapping with acceptance cone 206a. FIG. 8B shows emission cones 202a and 204a overlapping with acceptance cone 208a. FIG. 8C shows emission cones 202a and 204a overlapping with acceptance cone 210a.

Figure 6A:
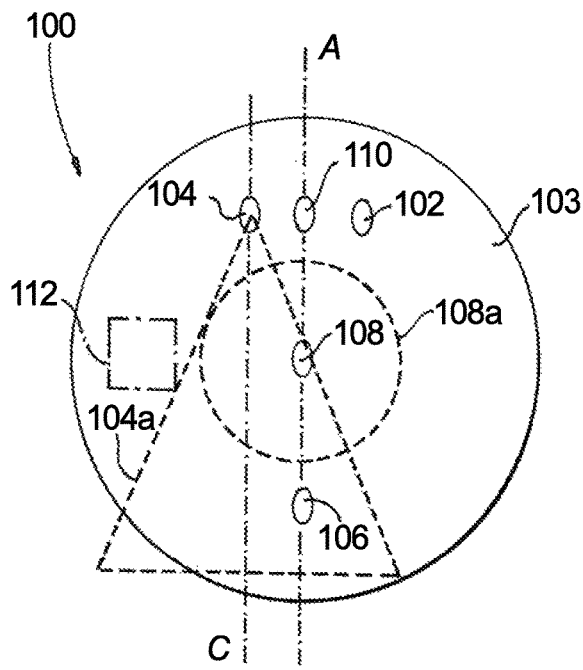
FIG. 6A is a bottom view of the system of FIGS. 1A-1C, showing a mid-scatter acceptance cone and a second emission cone.
Figure 6B:
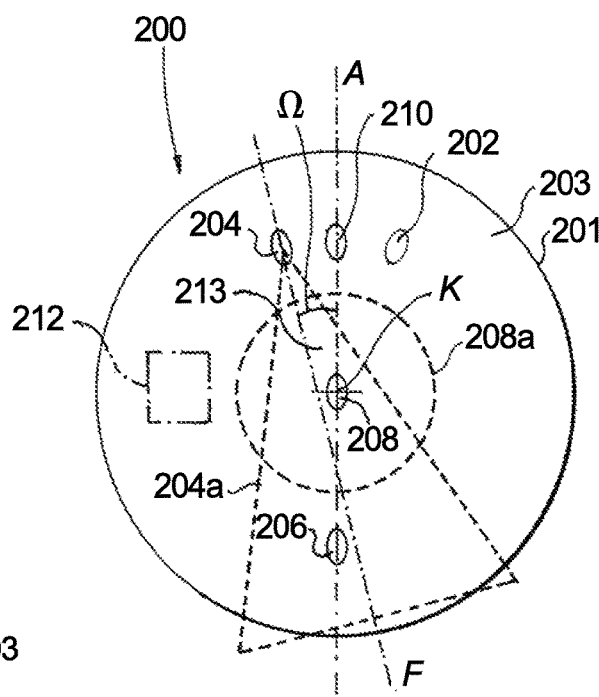
FIG. 6B is a bottom view of the system of FIGS. 3A-3C, showing a mid-scatter acceptance cone and a second emission cone.
Figure 7A:
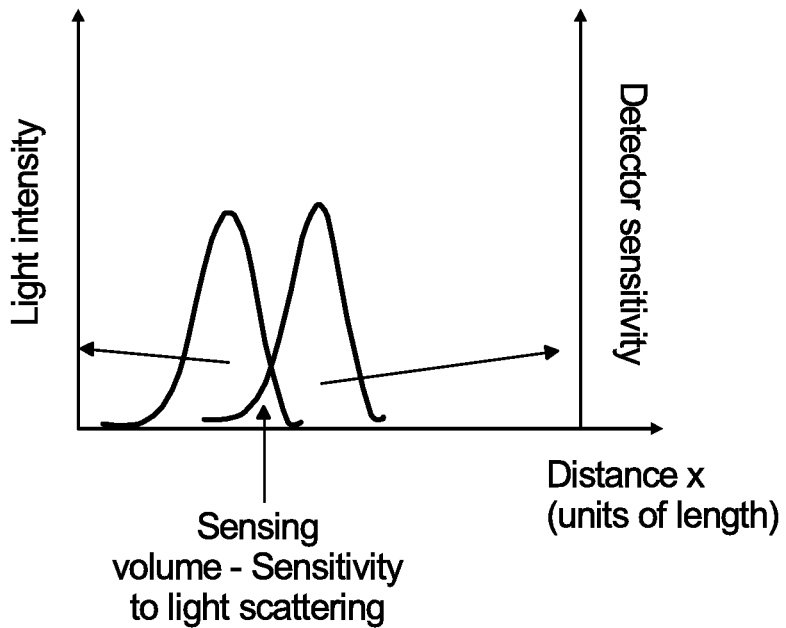
FIG. 7A is a schematic depiction of the overlap of the mid-scatter acceptance cone and the second emission cone of FIG. 6A.
Figure 7B:
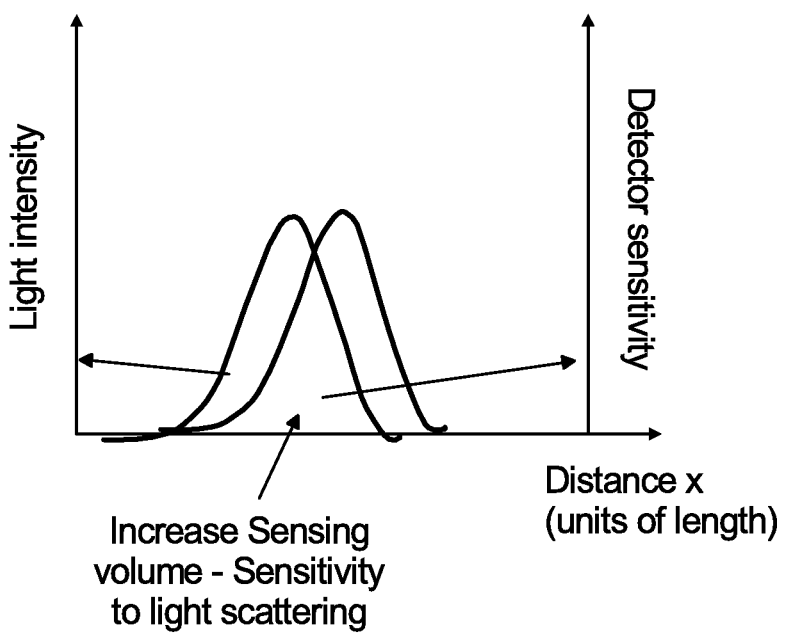
FIG. 7B is a schematic depiction of the overlap of the mid-scatter acceptance cone and the second emission cone of FIG. 6B, showing the increased sensing volume as compared to FIG. 7A.

FIGS. 6A and 6B provide a comparison of the sensing volumes between systems 100 and 200. System 100 is depicted in FIG. 6A and system 200 is depicted in FIG. 6B. As shown by FIG. 6B, by having the emission cones 202a and 204a of light sources 202 and 204 angled toward the light sensing devices, sensing via the mid-scatter light sensing device 208, can be better achieved as compared with system 100. This is because there is a better overlap between the emission cones 202a and 204a (only cone 204a is shown for sake of simplicity) and the acceptance cone 208a than compared with system 100. This is further exemplified by the charts of FIGS. 7A and 7B. FIG. 7A is associated with system 100 and FIG. 7B is associated with system 200. FIGS. 7A and 7B show how the distribution of light intensity from the respective light sources and light-sensor sensitivity form their respective sensing volumes.

Figure 6C:
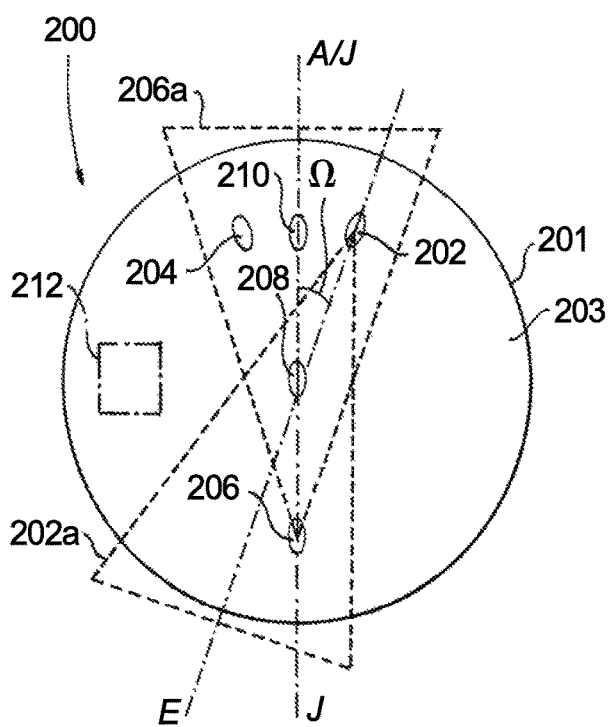
FIG. 6C is a bottom view of the system of FIGS. 3A-3C, showing a forward-scatter acceptance cone and a first emission cone.

FIG. 6C shows emission cone 202a and forward-scatter acceptance cone 206a. Emission cone 202a defines an emission cone axis E and acceptance cone 206a defines an acceptance cone axis J. Acceptance cone 206a overlaps with first emission cone 202a and second emission cone 204a. Emission cone 204a is not shown in FIG. 6C, but is shown in 6B and 4A, for example. FIG. 6C depicts the intersection of acceptance cone axis J and emission cone axis E as viewed from a bottom side of housing 201. An angle Ω between the emission cone axis and the acceptance cone axis is between zero and 180 degrees. In the embodiment of FIG. 6C, angle Ω is approximately 15 degrees. Angle Ω may vary depending on the spacing between light sources and light sensing devices.

When viewed from the bottom side of housing 201, axes E and J are as shown as a 2-dimensional projection on the plane of the paper (this 2D projection is the same for all figures described as being "bottom views" of the system/ detector). While emission cone axis E and acceptance cone axis J are shown as intersecting when viewed from the bottom side, they may or may not intersect one another in three dimensional space. By having the emission cones 202a and 204a of light sources 202 and 204 angled toward the light sensing devices, sensing via the forward-scatter light sensing device 206 (and for back-scatter sensing device 210), can be better achieved as compared with system 100. This is because there is a better overlap between the emission cones 202a and 204a (only cone 202a is shown for sake of simplicity) and the acceptance cone 206a than compared with system 100. Intersections between one or more emission cone axes and one or more acceptance cone axes are present as viewed from a bottom side of a housing for systems 200, 400, 500 and 600 (e.g. at least between emission cone axis F and acceptance cone axis L, between emission cone axis Z and acceptance cone axes W, X and Y, between emission cone axis $A_l$ and acceptance cone axes W, X and Y, between emission cone axis Q and acceptance cone axes M and O, between emission cone axis V and acceptance cone axis R, between emission cone axis U and acceptance cone axis T.) Even though emission cone axes and acceptance cone axes are typically shown in separate bottom-view figures, for sake of clarity, these intersections, where present, are readily appreciated by a combination of the bottom side views for a given detector system.

Figure 9A:
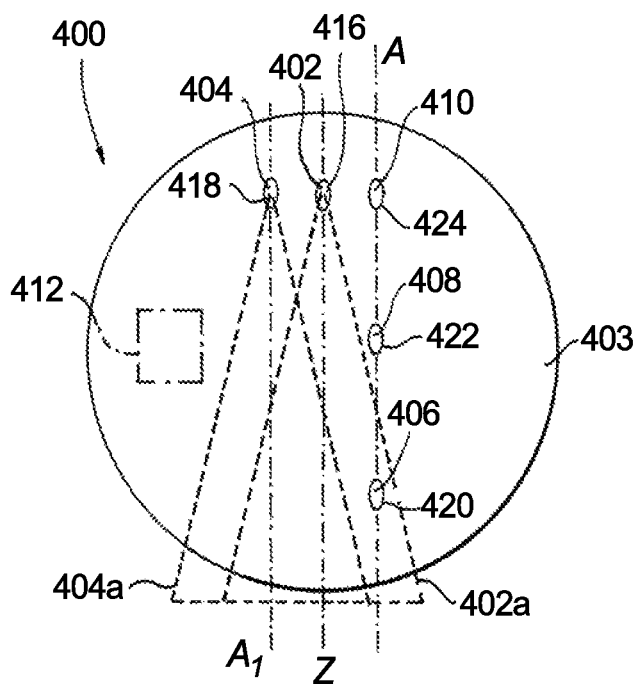
FIG. 9A is a schematic depiction of a bottom plan view of another embodiment of a system for particulate monitoring constructed in accordance with the present disclosure, showing a plurality of light sources and light sensing devices and first and second emission cones.
Figure 9B:
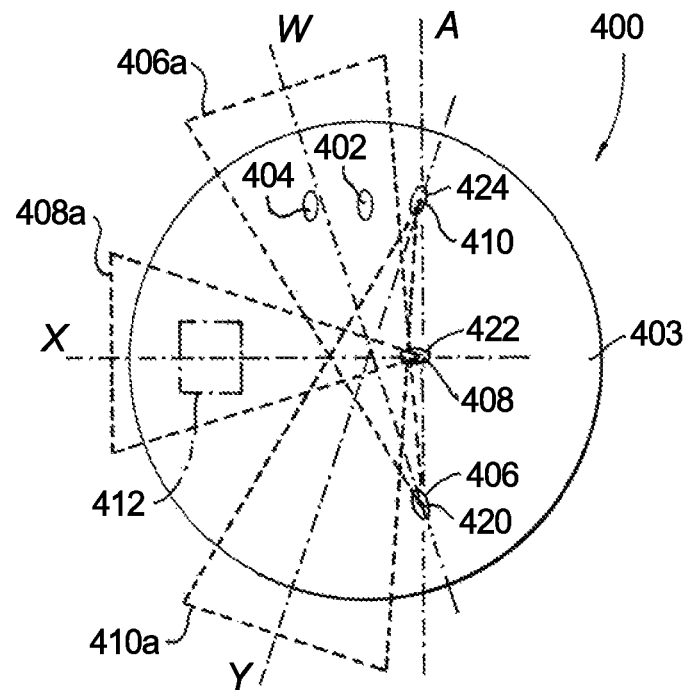
FIG. 9B is a schematic depiction of a bottom plan view the system of FIG. 9A, showing a plurality of light sources and light sensing devices and a plurality of acceptance cones, wherein each acceptance cone is associated with a respective one of the light sensing devices.

With reference now to FIGS. 9A-9B, a chamberless system for particulate detecting and monitoring 400 is shown. System 400 is similar to systems 100 and 200 except that instead of having a light sensing device between two light sources, light sensing devices 406, 408 and 410 are aligned with one another and oriented off to one side of two light sources 402 and 404. Light sources 402 and 404 are positioned next to one another. Each light source 402 and 404 defines a respective emission cone 402a and 404a, respectively. System 400 includes a housing 401 having a bottom surface 403 that includes apertures 416, 418, 420, 422 and 424 associated with the given light sources 402 and 404 and light sensing devices 406, 408 and 410, respectively, similar to system 100 described above. Light sensing devices 406, 408 and 410 and their respective apertures 420, 422 and 424 share a common centerline axis A.

With continued reference to FIGS. 9A and 9B, processor 412 is operatively connected to the light sensing devices 406, 408 and 410 and is configured to evaluate the scattered light for presence of one or more conditions, such as presence of solid objects, nuisance particulates, smoke particulates, and indoor air quality particulates in a monitored space 407, similar to processor 112. The light sensing devices 406, 408 and 410 are configured to measure signals, as described above with respect to systems 100 and 200. Each light sensing device 406, 408 and 410 defines a respective acceptance cone 406a, 408a and 410a, respectively. Each acceptance cone 406a, 408a and 110a has an acceptance cone axis W, X and Y, respectively.

Figure 10A:
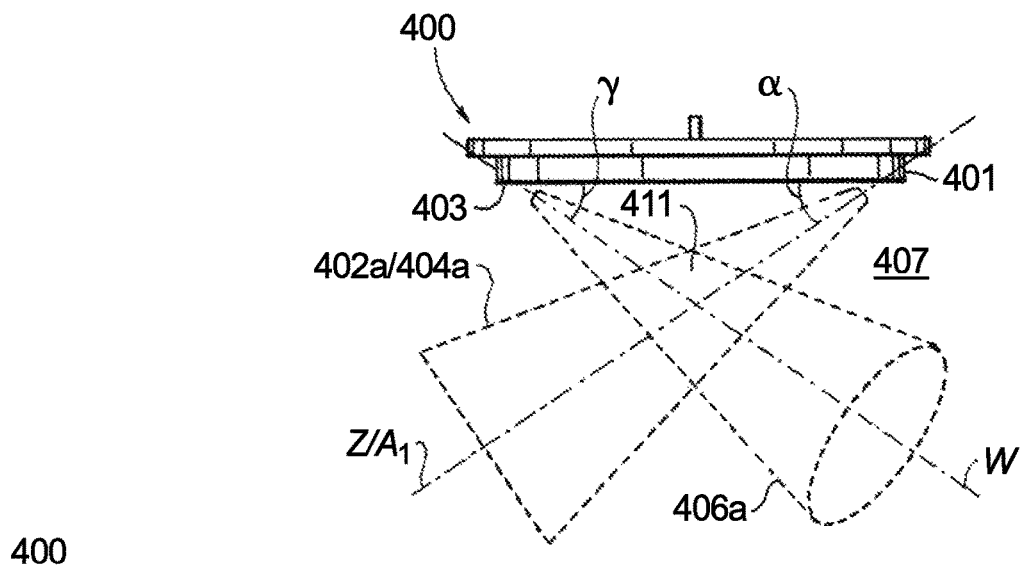
FIG. 10A is a schematic depiction of a side view of the system of FIG. 9A, showing a forward-scatter acceptance cone and first and second emission cones, and the overlapping regions between the emission cones and the forward-scatter acceptance cone that forms two sensing volumes.
Figure 10B:
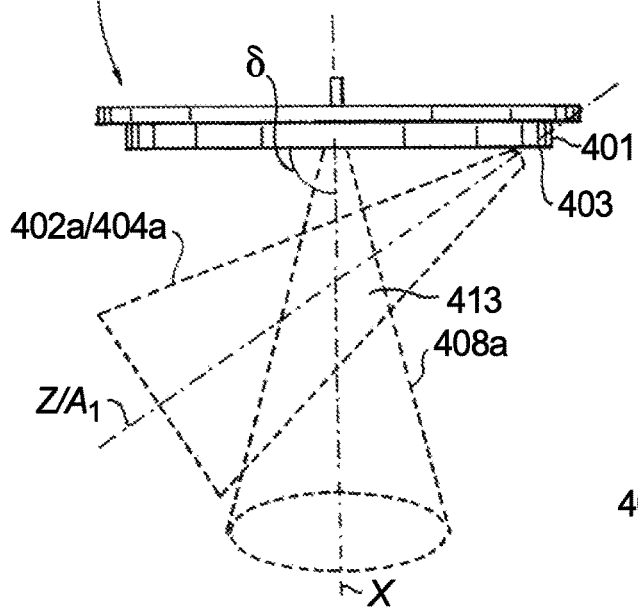
FIG. 10B is a schematic depiction of a side view of the system of FIG. 9A, showing a mid-scatter acceptance cone and first and second emission cones, and the overlapping regions between the emission cones and the mid-scatter acceptance cone that forms two sensing volumes.
Figure 10C:
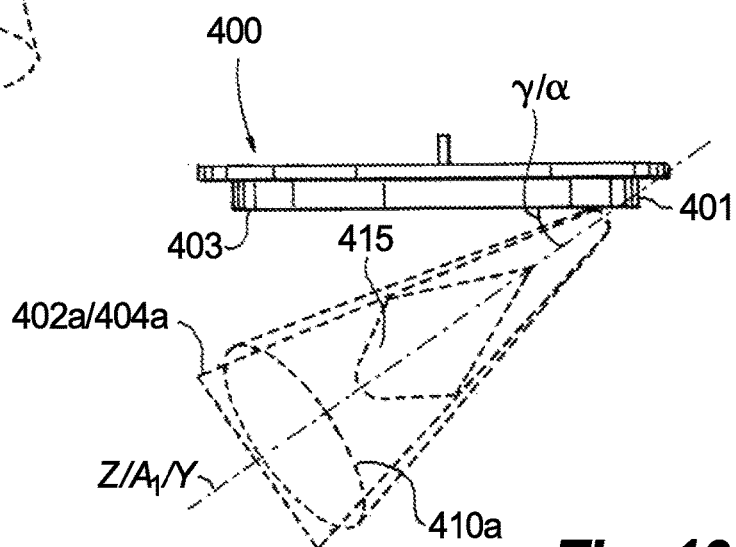
FIG. 10C is a schematic depiction of a side view of the system of FIG. 9A, showing a back-scatter acceptance cone and first and second emission cones, and the overlapping regions between the emission cones and the back-scatter acceptance cone that forms a sensing volume.

As shown in FIGS. 10A-10C, the overlap of the field of view, e.g. acceptance cones 406a, 408a and 410a, with the first and second emission cones 402a and 404a form different overlapping sensing volumes 411, 413 and 415, respectively. Each emission cone 402a and 404a define an acceptance cone axes Z and $A_1$, respectively. The overlap of the field of view, e.g. overlap of acceptance cones 406a, 408a and 410a, with the first emission cone 402a form different overlapping sensing volumes 411, 413 and 415, respectively. Similar sensing volumes are also formed by the overlap of the acceptance cones 406a, 408a and 410a with the second emission cone 404a (which are not shown for sake of clarity). Ultimately, for the embodiments shown and described herein, in 3D space there will be a total of six different sensing volumes, some of which may overlap with one another.

As shown in FIG. 10A, light sensing device 406 is a forward scatter light sensing device, similar to light sensing device 106. Acceptance cone 406a overlaps with first emission cone 402a and second emission cone 404a the overlap defines forward-scatter sensing volumes 411. As described above (and similar to systems 100 and 200), for the sake of clarity, only sensing volume 411 defined by the overlap of acceptance cone 406a and first emission cone 402a is shown in FIG. 10A.

As shown in FIG. 10B, light sensing device 408 is a mid-scatter or side-scatter light sensing device, similar to light sensing device 108. Acceptance cone 408a overlaps with first emission cone 402a and second emission cone 404a to define mid-scatter sensing volumes 413. As described above (and similar to systems 100 and 200), for the sake of clarity, only sensing volume 413 defined by the overlap of acceptance cone 408a and first emission cone 402a is shown in FIG. 10B.

As shown in FIG. 10C, light sensing device 410 is a back-scatter light sensing device, similar to light sensing device 110. Acceptance cone 410a overlaps with first emission cone 402a and second emission cone 404a. The overlap defines back-scatter sensing volumes 415. As described above (and similar to systems 100 and 200), for the sake of clarity, only sensing volume 415 defined by the overlap of acceptance cone 410a and first emission cone 402a is shown in FIG. 10C. By having light sensing device 410 and/or its respective acceptance cone 410a and acceptance axis Y angled toward at least one of the emission cone axes of the light sources, in this case emission cone axes $A_1$ and Z, the backscatter sensing volumes 415 are truncated and allows for better sensing at a close region instead of extending into the entire environment. In addition, angling the acceptance cone axes W and X of the light sensing devices 406 and 408 toward the emission cone axes $A_1$ and Z will increase the forward and mid sensing volumes, 411 and 413, respectively, because of the increased overlap between the emission and acceptance cones.

Figure 11A:
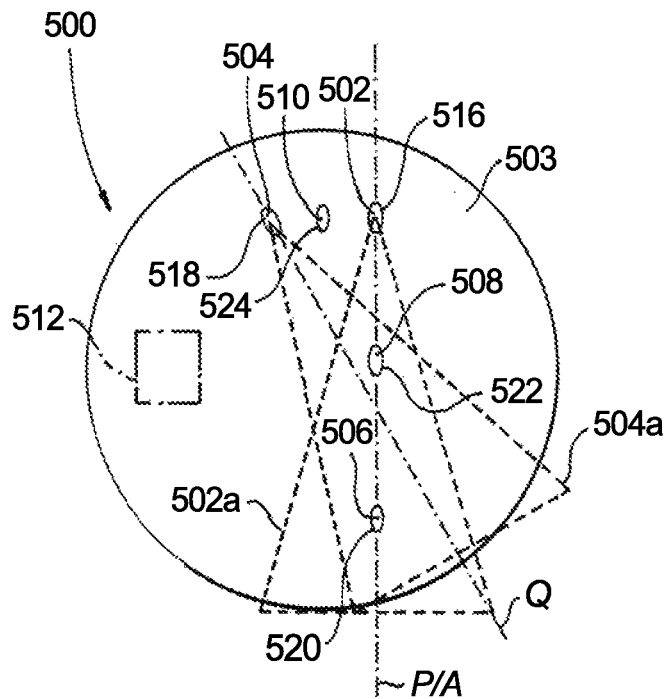
FIG. 11A is a schematic depiction of a bottom plan view of another embodiment of a system for particulate monitoring constructed in accordance with the present disclosure, showing a plurality of light sources and light sensing devices and first and second emission cones.

With reference now to FIG. 11A, another embodiment of a system for particulate detecting and monitoring 500 is shown. System 500 is similar to systems 100 and 200 except that instead of having light sensing devices and/or their associated apertures along the same central axis A, light sensing devices 506 and 508 are aligned with one another in one direction but offset from light sensing device 510. Light sources 502 and 504 are positioned on either side of light sensing device 510. Each light source 502 and 504 defines an emission cone 502a and 504a, respectively. Emission cone 502a defines an acceptance cone axis P and emission cone 504a defines an acceptance cone axis Q. A housing 501 includes a bottom surface 503 having apertures 516, 518, 520, 522 and 524 associated with the given light sources 502 and 504 and light sensing devices 506, 508 and 510, respectively, similar to system 100 described above. Light sensing devices 506 and 508 and the light source 502 share a common centerline axis A.

Figure 11B:
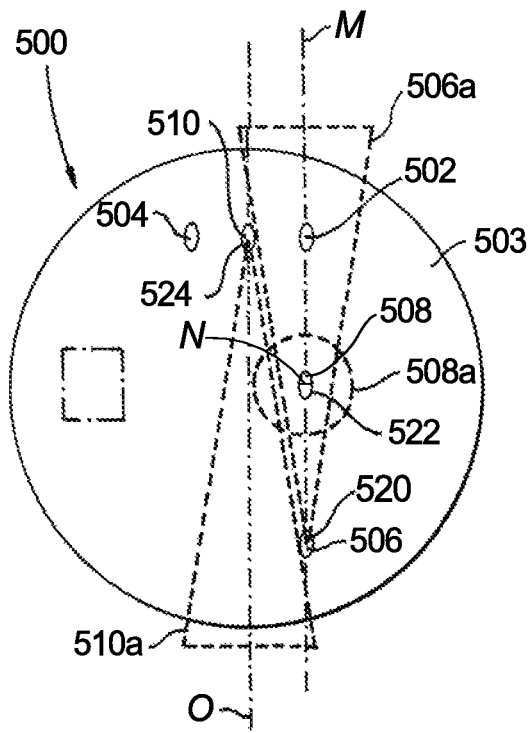
FIG. 11B is a schematic depiction of a bottom plan view of the system of FIG. 11A, showing a plurality of light sources and light sensing devices and a plurality of acceptance cones, wherein each acceptance cone is associated with a respective one of the light sensing devices.

With reference to FIG. 11B, the light sensing devices 506, 508 and 510 are configured to measure signals, similar to that described above with respect to systems 100 and 200. Each light sensing device 506, 508 and 510 defines a respective acceptance cone 506a, 508a and 510a, respectively. Each acceptance cone 506a, 508a and 510a has a respective central axis M, N and O, respectively. A processor 512 is operatively connected to the light sensing devices 506, 508 and 510 and is configured to evaluate the scattered light for presence of one or more conditions, such as presence of solid objects, nuisance particulates, smoke particulates, and indoor air quality particulates in a monitored space 507, similar to processor 112.

Figure 12A:
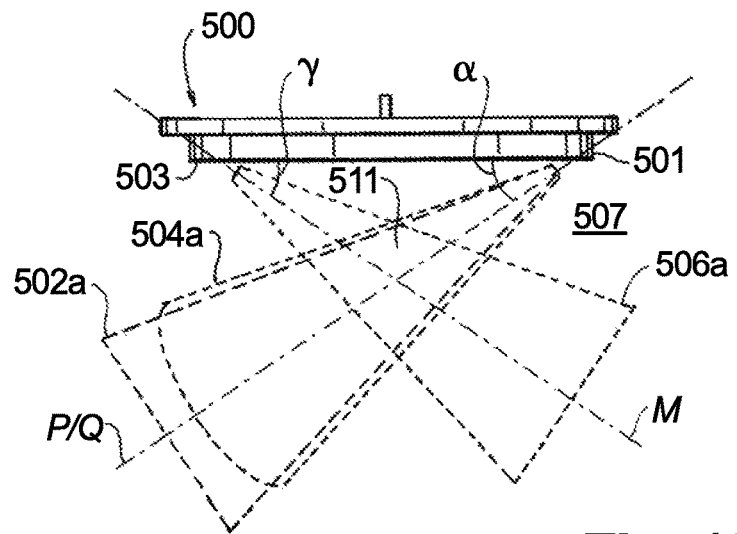
FIG. 12A is a schematic depiction of a side view the system of FIG. 11A, showing a forward-scatter acceptance cone and first and second emission cones, and the overlapping regions between the emission cones and the forward-scatter acceptance cone that forms two sensing volumes.
Figure 12B:
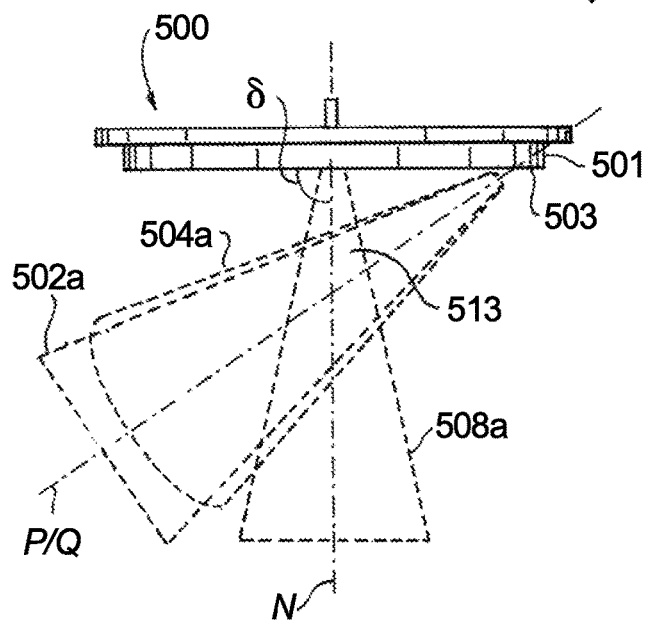
FIG. 12B is a schematic depiction of a side view the system of FIG. 11A, showing a mid-scatter acceptance cone and first and second emission cones, and the overlapping regions between the emission cones and the mid-scatter acceptance cone that forms two sensing volumes.
Figure 12C:
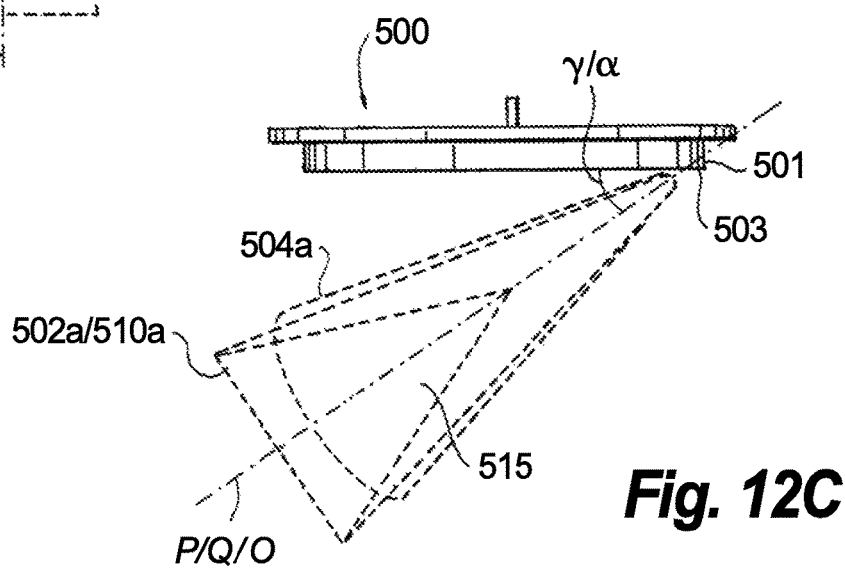
FIG. 12C is a schematic depiction of a side view the system of FIG. 11A, showing a back-scatter acceptance cone and first and second emission cones, and the overlapping regions between the emission cones and the back-scatter acceptance cone that forms two sensing volumes.

As shown in FIGS. 12A-12C, the overlap of the field of view, e.g. acceptance cones 506a, 508a and 510a, with the first and second emission cones 502a and 504a form different overlapping sensing volumes 511, 513 and 515, respectively. The overlap of the field of view, e.g. acceptance cones 506a, 508a and 510a, with the first cone 502a form different overlapping sensing volumes 511, 513 and 515, respectively. Similar sensing volumes are also formed by the overlap of the acceptance cones 506a, 508a and 510a with the second emission cone 504a (which are not shown for sake of clarity). Ultimately, for the embodiments shown and described herein, in 3D space there will be a total of six different sensing volumes, some of which may overlap with one another.

As shown in FIG. 12A, light sensing device 506 is a forward scatter light sensing device, similar to light sensing device 106. Acceptance cone 506a overlaps with first emission cone 502a and second emission cone 504a. The overlaps define respective forward-scatter sensing volumes 511. As described above (and similar to systems 100 and 200), for the sake of clarity, FIG. 12A only shows sensing volume 511 defined by the overlap of acceptance cone 506a and first emission cone 502a.

As shown in FIG. 12B, light sensing device 508 is a mid-scatter or side-scatter light sensing device, similar to light sensing device 108. Acceptance cone 508a overlaps with first emission cone 502a and second emission cone 504a to define mid-scatter sensing volumes 513. As described above (and similar to systems 100 and 200), for the sake of clarity, FIG. 12B only shows sensing volume 513 defined by the overlap of acceptance cone 508a and first emission cone 502a.

As shown in FIG. 12C, light sensing device 510 is a backscatter light sensing device, similar to light sensing device 110. Acceptance cone 510a overlaps with first emission cone 502a and second emission cone 504a. The overlap defines back-scatter sensing volumes 515. As described above (and similar to systems 100 and 200), for the sake of clarity, FIG. 12C only shows sensing volume 515 defined by the overlap of acceptance cone 510a and first emission cone 502a.

By placing light source 502 in line with light sensing devices 506 and 508, the mid-scatter and forward scatter sensing volumes for light source 502 will be increased (due to an increase in the overlap of emission cone 502a with acceptance cones 506a and 508a) as compared to system 100. By placing the light emitting device 504 father away from the common centerline axis A between light sensing devices 506 and 508, as compared to system 100, the mid-scatter and forward scatter sensing volume for light source 504 will be reduced (due to a decrease in the overlap of emission cone 504a with acceptance cones 506a and 508a). However angling light source 504 and/or its respective emission cone 504a, and/or aperture 518 towards one or more of the forward and mid light sensing devices 506 and 508, will increase the mid-scatter and forward scatter sensing volumes for the light source 504, as compared to a similar system with the light source 504 aligned parallel with centerline axis A. In addition, by angling light source 504, its respective emission cone 504a, and/or its aperture 518, towards the backscatter light sensing device 510 and/or its respective acceptance cone 510a (e.g. so that the emission cone axis Q intersects acceptance cone axis O as viewed from a bottom side of detector 500), the backscatter sensing volume 515 for light source 504 will be truncated and allow for better sensing at a close region instead of extending into the entire environment.

Figure 13A:
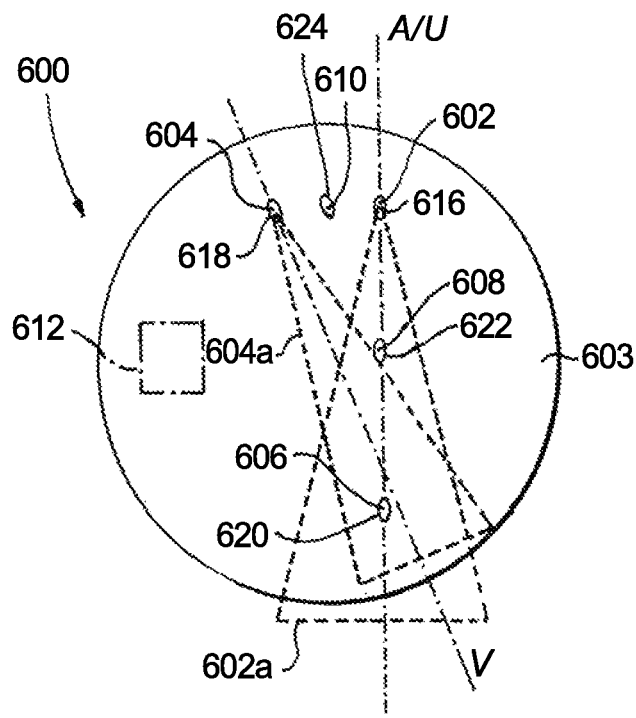
FIG. 13A is a schematic depiction of a bottom plan view of another embodiment of a system for particulate monitoring constructed in accordance with the present disclosure, showing a plurality of light sources and light sensing devices and first and second emission cones.

With reference now to FIG. 13A, another embodiment of a system for particulate detecting and monitoring 600 is shown. System 600 is similar to system 500 except that the backscatter light sensing device 610 and/or its respective acceptance cone 610a is angled towards the emission cone axis of light source 602. Each light source 602 and 604 defines an emission cone 602a and 604a, respectively. Emission cone 602a defines an emission cone axis U and emission cone 604a defines an emission cone axis V. Housing 601 has a bottom surface 603 that includes apertures 616, 618, 620, 622 and 624 associated with the given light sources 602 and 604 and light sensing devices 606, 608 and 610, respectively, similar to system 100 described above. Light sensing devices 606 and 608 and light source 602 share a common centerline axis A.

Figure 13B:
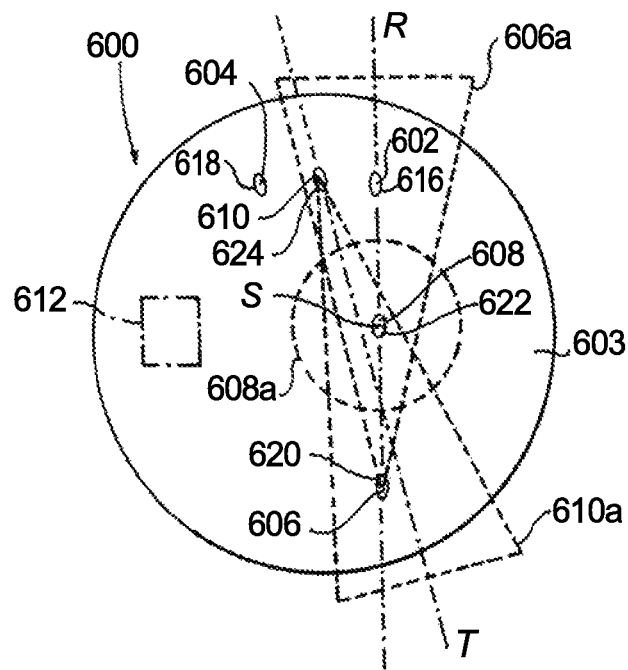
FIG. 13B is a schematic depiction of a bottom plan view the system of FIG. 13A, showing a plurality of light sources and light sensing devices and a plurality of acceptance cones associated with the light sensing devices

With reference to FIGS. 13A-13B, the light sensing devices 606, 608 and 610 are configured to measure signals, similar to that described above with respect to systems 100 and 200. Each light sensing device 606, 608 and 610 defines an acceptance cone 606a, 608a and 610a, respectively. Each acceptance cone 606a, 608a and 610a has an emission cone axes R, S and T, respectively. As viewed from a bottom side of detector housing 601, e.g. in the view of FIGS. 13A and 13B, acceptance cone axis T is angled with respect to axis U of light source 602. Processor 612 is operatively connected to the light sensing devices 606, 608 and 610 and is configured to evaluate the scattered light for presence of one or more conditions, such as presence of solid objects, nuisance particulates, smoke particulates, and indoor air quality particulates in a monitored space 607, similar to processor 112.

As shown in FIGS. 14A-14C, the overlap of acceptance cones 606a, 608a and 610a, with first emission cone 602a forms different sensing volumes 611, 613 and 615, respectively. Similar sensing volumes are also formed by the overlap of the acceptance cones 606a, 608a and 610a with the second emission cone 604a (which are not shown in most of the views for sake of clarity). Ultimately, in 3D space there will be a total of six different sensing volumes, some of which may overlap with one another.

As shown in FIG. 14A, light sensing device 606 is a forward scatter light sensing device, similar to light sensing device 106. Acceptance cone 606a overlaps with first emission cone 602a and second emission cone 604a to define forward-scatter sensing volumes 611. As described above (and similar to systems 100 and 200), for the sake of clarity, FIG. 14A only shows sensing volume 611 defined by the overlap of acceptance cone 606a and first emission cone 602a.

As shown in FIG. 14B, light sensing device 608 is a mid-scatter or side-scatter light sensing device, similar to light sensing device 108. Acceptance cone 608*a* overlaps with first emission cone 602*a* and second emission cone 604*a* to define mid-scatter sensing volumes 613. As described above (and similar to systems 100 and 200), for the sake of clarity, FIG. 14B only shows sensing volume 613 defined by the overlap of acceptance cone 608*a* and first emission cone 602*a*.

As shown in FIG. 14C, light sensing device 610 is a back-scatter light sensing device, similar to light sensing device 110. Acceptance cone 610*a* overlaps with first emission cone 602*a* and second emission cone 604*a*. The overlap defines back-scatter sensing volumes 615. As described above (and similar to systems 100 and 200), for the sake of clarity, FIG. 14C only shows sensing volume 615 defined by the overlap of acceptance cone 610*a* and first emission cone 602*a*.

By placing light source 602, and/or its associated aperture 616, in line with light sensing devices 606 and 608, and/or their associated apertures 620 and 622, the mid-scatter and forward scatter sensing volumes, 613 and 611, respectively, for light source 602 will be increased (due to an increase in the overlap of emission cone 602*a* with acceptance cones 606*a* and 608*a*) as compared to system 100. By placing the light emitting device 604 father away from the common centerline axis A, as compared to system 100, the mid-scatter and forward scatter sensing volume for light source 604 will be reduced (due to a decrease in the overlap of emission cone 604*a* with acceptance cones 606*a* and 608*a*). However angling light source 604, its respective emission cone 604*a*, and/or aperture 618 towards one or more of the forward and mid light sensing devices 606 and 608, their respective emission cone 606*a* and 608*a*, and/or their associated apertures 620 and 622, will increase the mid-scatter and forward scatter sensing volumes, 613 and 611, respectively, for light source 604, as compared to a system with light source 604 aligned parallel with centerline axis A, as viewed from the bottom view of FIG. 13A. In addition, by angling light sensing device 610, its respective emission cone 610*a*, and/or its aperture 624 towards the emission cone 602*a*, the backscatter sensing volume 615 for light source 602 will be truncated and allow for better sensing at a close region instead of extending into the entire environment.

Figure 5:
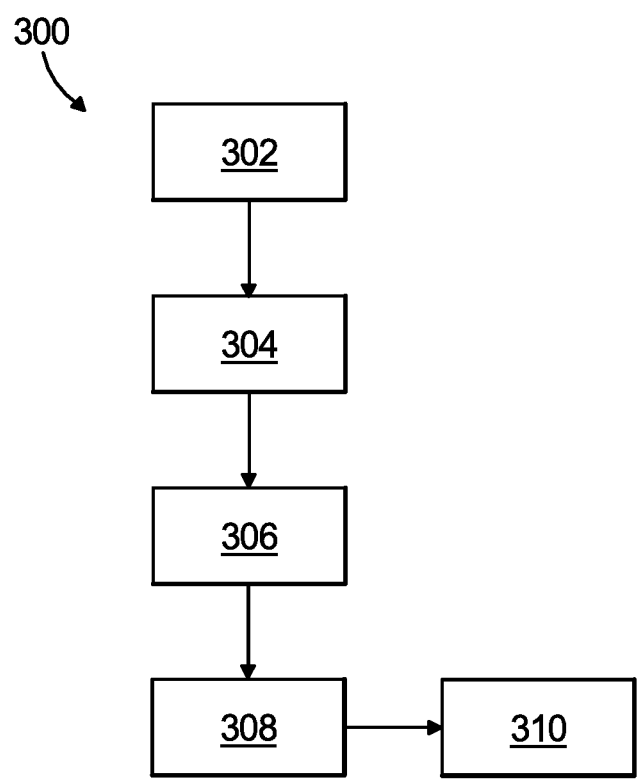
FIG. 5 is a schematic diagram of a method of operating a system for particulate monitoring.

As shown in FIG. 5, a method 300 of operating a system for particulate monitoring, e.g. systems 100, 200, 400, 500 or 600, includes emitting light from one or more light sources, e.g. light sources 102, 104, 202, 204, 402, 404, 502, 504, 602, or 604, of the system into a monitored space, as indicated schematically by box 302. Emitting light from the light sources includes emitting light from two light sources as respective emission cones, e.g. emission cones, 102*a* and 104*a*, 202*a* and 204*a*, 402*a* and 404*a*, 502*a* and 504*a*, or 602*a* and 604*a*. Emitting light from the light sources includes emitting a first light having a first wavelength from one of the light sources and emitting a second light having a second wavelength from the other one of the light sources. The first wavelength is in at least one of the UV spectrum or the visible spectrum, and the second wavelength is in at least one of the visible spectrum or the IR spectrum. It is contemplated that with any of systems 100-600, any of light sources can switch their wavelength being emitted back and forth, e.g. a light source can emit light in the UV spectrum and then switch to IR, or vice a versa.

The method 300 can include polarizing light entering into at least one of light sensing devices, e.g. light sensing devices 106, 108, 110, 206, 208, 210, 406, 408, 410, 506, 508, 510, 606, 608, and/or 610, and/or the light sources with a polarizing filter, e.g. polarizing filter 114, as indicated schematically by box 304. Polarized light refers to the orientation of the electric field with respect to a scattering plane formed by the emission cone axis of the emission cone and the acceptance cone axis of the acceptance cone. The light sources can emit polarized light with the electric field oriented parallel to the scattering plane, perpendicular to the scattering plane or at an arbitrary angle. In addition, the polarizing filter on one or more of light sensing devices can be oriented to accept light polarized with a particular orientation. Likewise, a polarizing filter can be placed in front of one or more of the light sources, e.g. LEDs, to ensure the emitted light is polarized with a given orientation. Typically, the filters are physically placed in a plane perpendicular to the emission cone axis of the emission cone for the light source and the acceptance cone axis of the acceptance cone for the sensing devices, however placement in other orientations is permitted, e.g. for ease of manufacturability, but performance may be sacrificed. Light scattering by a material is polarization dependent for most materials. The orientation of the polarizing filter on the light sources and light sensing devices are oriented to enhance the differences between particulate scattering of interest and nuisances such as bugs, dust or solid objects such as cargo containers.

In some embodiments, method 300 includes discriminating between airborne particle types using the polarizing filter, as indicated schematically by box 306. The method 300 includes detecting scattered light with the light sensing devices of the system, e.g. light sensing devices 106, 108, 110, 206, 208, 210, 406, 408, 410, 506, 508, 510, 606, 608, and/or 610, as indicated schematically by box 308. The detection of scattered light is indicative of one or more indoor air quality conditions in the monitored space. The method includes determining and monitoring for target gases, particulate contaminants, microbial contaminants or other conditions, in addition to smoke, based on the detected scattered light, as indicated schematically by box 310.

Those skilled in the art will readily appreciate that embodiments of the present invention can include more or less light sources and/or light sensing devices than shown in the figures. For example, in some embodiments, only mid- and back-scatter light sensing devices may be used. Additionally, for example, multi-color light sources that switch between two different colors (e.g. wavelengths) can be used, resulting in only one light source being needed. Those skilled in the art will also readily appreciate that housing, e.g. housing 101, while shown with a circular cross-section, could also be rectangular in shape and have a rectangular cross-section.

Those skilled in the art will readily appreciate that in some embodiments the transmitted light (e.g. from LEDs 102, 104, 202, 204, 402, 404, 502, 504, 602 and/or 604) excites fluorescent particles, such as mold or pollen particles or other microbial contaminants, in the space. One or more of the light sensing devices, e.g. 106, 108, 110, 206, 208, 210, 406, 408, 410, 506, 508, 510, 606, 608, and/or 610, of the systems 100, 200, 400, 500 and/or 600, are utilized to sense light emitted (e.g. scattered/fluoresced back) from the fluorescent particles. In some embodiments, one or more bandpass filters may be used in conjunction with one or more of the light sensing devices, e.g. 106, 108, 110, 206, 208, 210, 406, 408, 410, 506, 508, 510, 606, 608, and/or 610, to allow detection of only the fluoresced light. It is also contemplated that, for some embodiments, bandpass filters can also be used to block out ambient light but allow scattered light (not fluoresced) through to the light sensing devices. Embodiments of the present disclosure may be utilized to detect or monitor the space for the presence of gaseous species in the space. The target gaseous species may include CO, radon, $H_2S$, VOCs, refrigerants, hydrocarbons and/or the like. In some embodiments, systems 100, 200, 400, 500 and/or 600 are configured to detect an ambient light level in the space to improve sensitivity and reliability of detecting smoke and for other indoor air quality monitoring and detection. The embodiments disclosed herein allow for systems 100, 200, 400, 500 and/or 600 to detect and monitor other indoor air quality conditions, such as target gases, particulate contaminants, microbial contaminants and/or other conditions, in addition to smoke. This eliminates the need for additional, separately powered indoor air quality sensors to be utilized in the same space in which the smoke detector is placed, resulting in substantial consumer and business cost savings.

The methods and systems of the present disclosure, as described above and shown in the drawings, provide particulate monitoring with superior properties including increased sensing robustness in aerospace applications that are better able to meet Federal Aviation Administration (FAA) requirements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for detection and monitoring, comprising:
    two light sources defining a first axis each configured to emit light into a monitored space, wherein at least one of the light sources is configured to emit a respective emission cone having a respective emission cone axis;
    three light sensing devices defining a second axis perpendicular to the first axis each configured to receive scattered light, wherein at least one of the light sensing devices defines a respective acceptance cone having a respective acceptance cone axis, wherein at least one of the emission cone axis of the emission cone or the acceptance cone axis of the light sensing device is angled toward the other; and
    a processor operatively connected to the at least one light sensing devices to evaluate the scattered light for presence of particulates in the monitored space.

2. The system of claim 1, wherein the emission cone axis of one of the the light sources and the acceptance cone axis of the one of the light sensing devices intersect one another as viewed from a bottom side of a detector housing.

3. The system of claim 1, wherein an angle between the emission cone axis and the acceptance cone axis is between zero and 180 degrees.

4. The system of claim 1, wherein at least one of the light sensing devices is positioned between the two light sources.

5. The system of claim 1, wherein the light sources are configured to emit light of different wavelengths.

6. The system of claim 1, wherein a first light source of the two light sources is configured to emit light at a first wavelength in at least one of a UV spectrum or a visible spectrum.

7. The system of claim 6, wherein a second light source of the two light sources is configured to emit light at a second wavelength in at least one of the visible spectrum or an IR spectrum.

8. The system of claim 1, further comprising a polarizing filter optically coupled to at least one of the three light sensing devices or the two light sources.

9. The system of claim 1, further comprising a detector housing, wherein the light sources and the light sensing devices are positioned within the detector housing, wherein the detector housing includes apertures, wherein each aperture is associated with a respective one of the light sources or the light sensing devices.

10. The system of claim 9, wherein at least two apertures associated with the three light sensing devices share a common centerline axis.

11. The system of claim 1, wherein the processor is configured to evaluate at least one of scattered light or fluorescence to detect and monitor for at least one of target gases, solid objects, particulate contaminants, PM2.5, PM10, microbial contaminants, or smoke.

12. A method of operating a system for detection and monitoring, comprising:
    emitting light from two light sources defining a first axis of the system into a monitored space, wherein emitting light includes emitting light from each of the two light sources as respective emission cones, wherein each emission cone includes an emission cone axis; and
    detecting scattered light with three light sensing devices of the system, wherein at least one of the three light sensing devices defines a second axis perpendicular to the first axis and defines a respective acceptance cone having an acceptance cone axis, wherein at least one of the emission cone axis of the emission cone or the acceptance cone axis of the light sensing device is angled toward the other and wherein the detection of scattered light is indicative of the presence of particulates in the monitored space.

13. The method of claim 12, wherein the emission cone axis of the light sources and the acceptance cone axis of the light sensing devices intersect one another as viewed from a bottom side of a detector housing.

14. The method of claim 12, wherein an angle between the emission cone axis and the acceptance cone axis is between zero and 180 degrees.

15. The method of claim 12, wherein emitting light from the two light sources includes emitting a first light having a first wavelength from one of the light sources, wherein the first wavelength is in at least one of the UV spectrum or the visible spectrum, and emitting a second light having a second wavelength from another one of the light sources, wherein the second wavelength is in at least one of the visible spectrum or the IR spectrum.

16. The method of claim 12, further comprising at least one of:
    (i) polarizing light entering into at least one of the light sensing devices with a polarizing filter; or
    (ii) polarizing light exiting at least one of the light sources with a polarizing filter.

17. The method of claim 13, further comprising determining and monitoring at least one of target gases, solid objects, particulate contaminants, microbial contaminants or smoke.

* * * * *